(12) United States Patent
Tikhonenko et al.

(10) Patent No.: US 8,146,720 B2
(45) Date of Patent: Apr. 3, 2012

(54) SHOCK ABSORBER FOR A TRANSPORTATION MEANS

(75) Inventors: Oleg Olegovich Tikhonenko, Moscow (RU); Vladimir Pavlovich Lobko, Yubileiniy (RU)

(73) Assignee: Troy Capital Group Corp, Las Vegas, NV (US)

( * ) Notice: Subject to any disclaimer, the term of this patent is extended or adjusted under 35 U.S.C. 154(b) by 0 days.

(21) Appl. No.: 12/806,597

(22) Filed: Aug. 17, 2010

(65) Prior Publication Data

US 2012/0043170 A1 Feb. 23, 2012

(51) Int. Cl.
*B60T 7/12* (2006.01)
*F16F 9/30* (2006.01)

(52) U.S. Cl. .................. 188/268; 188/322.18; 188/129; 267/201

(58) Field of Classification Search ............. 188/284, 188/285, 288, 289, 300, 322.13, 322.16–322.19, 188/322.22, 129, 268, 287; 267/64.12, 201
See application file for complete search history.

(56) References Cited

U.S. PATENT DOCUMENTS

| 3,327,814 | A | * | 6/1967 | Nickell | 188/129 |
|---|---|---|---|---|---|
| 3,583,530 | A | * | 6/1971 | De Venne | 188/268 |
| 4,096,927 | A | * | 6/1978 | Takatsu | 188/268 |
| 4,458,887 | A | * | 7/1984 | Shimokura et al. | 267/64.12 |
| 5,174,421 | A | * | 12/1992 | Rink et al. | 188/374 |
| 5,257,680 | A | * | 11/1993 | Corcoran et al. | 188/129 |
| 5,884,734 | A | * | 3/1999 | Hiramoto et al. | 188/322.18 |
| 5,927,448 | A | * | 7/1999 | Yamazaki | 188/281 |
| 6,206,153 | B1 | * | 3/2001 | Popjoy | 188/300 |
| 7,628,257 | B1 | * | 12/2009 | Lu | 188/282.6 |
| 2009/0001636 | A1 | * | 1/2009 | Miyasato et al. | 267/64.13 |
| 2009/0200126 | A1 | * | 8/2009 | Kondo et al. | 188/267.1 |

* cited by examiner

*Primary Examiner* — Christopher Schwartz
(74) *Attorney, Agent, or Firm* — Aleksandr Smushkovich

(57) ABSTRACT

A shock absorber comprises a sleeve, a cylindrical piston with a seal attached to the cylindrical surface of piston with two side surfaces, a rod coupled with the piston, a piston cap enclosing the sleeve on the piston's side, and a rod cap enclosing the sleeve on the rod's side. The piston and rod move within the sleeve overcoming resistance of oil/gas cross-flows from one sleeve's chamber to the other, friction between the seal and the sleeve's walls, and friction between the rod and a seal mounted in the rod cap. The proposed absorber allows increasing the resistance offered to the movement of piston thereby improving the efficiency of damping, and suppressing/avoiding auto-oscillation and resonance regimes. This is achieved by providing a number of narrowing/widening necks arranged on the sleeve's walls within regions adjoined to the caps. Different embodiments combine features conditioned by various diameter differences for the necks, etc.

12 Claims, 33 Drawing Sheets

SHOCK ABSORBER FOR A TRANSPORTATION MEANS

FIELD OF THE INVENTION

The invention relates to the machine construction field, more specifically to the field of designing dampers (shock absorbers) or struts mostly for transportation means. It might be particularly utilized for manufacturing hydraulic, pneumo-hydraulic, and pneumatic shock absorbers applicable, for example, for support of frame elements of a transportation means.

BACKGROUND OF THE INVENTION

Although there are known a great variety of dampers or shock absorbers, a majority thereof typically comprise common elements: a sleeve (cylinder) having a longitudinal axis and filled with suitable oil, a damper piston (herein further called 'piston'), and a piston rod (herein further called 'rod') fixedly coupled with the piston. The rod and piston are capable of accomplishing a reciprocating movement within the sleeve along the longitudinal axis thereof. Besides the aforementioned elements, a shock absorber can include a housing, typically enclosing the sleeve, and additional external cylinders. The piston partitions the sleeve into two chambers of variable volumes. As a rule, the piston includes a plurality of precisely calibrated orifices for oil cross-flow from one chamber to the other (e.g. see Russian Useful Model 74602). Some dampers may comprise a cavity between the housing and the sleeve, while the sleeve may include orifices for oil cross-flow from a chamber of the sleeve into the cavity.

At present, one-tube gas-oil shock absorbers with a high-pressure gas chamber and two-tubes oil shock absorbers with low-pressure gas support are among widest-spread damper devices. In the related art there is known a shock absorber including an elastic element (spring), a cylinder, a piston, and a rod (U.S. Pat. No. 3,857,307 issued 31 Dec. 1974). It can be applied for improving a damper system of transportation means, wherein the load exerted onto the suspension unit varies within a broad range, which may cause maximal values of the amplitude of piston's oscillations relatively to the middle point on the longitudinal axis of the shock absorber. A drawback of such device is an insufficient increase of a force counteracting the movement of piston in the cylinder within the region(s) proximate to the absorber's cap(s). The most similar device found in the related art (further called 'prototype') is considered a damper, designed according to Russian Useful Model 74602 that comprises a sleeve, a piston, a piston cap, a rod, a rod cap, wherein the rod and piston are capable of collective displacing within the sleeve along the longitudinal direction of sleeve. The aforementioned prototype shares certain common features with the present invention, but is in fact essentially different in its design principles. The prototype has the following shortcomings:

an insufficient increase of a force counteracting the movement of the piston in the sleeve in the regions proximate to the caps;

underuse of two sealing lateral surfaces during the forward and the reverse travels of the piston, where the piston is located in the sleeve within a vicinity proximate to the piston cap; and underuse of two sealing lateral surfaces during the forward and the reverse travels of the piston, where the piston is located in the sleeve within a vicinity proximate to the rod cap.

BRIEF SUMMARY OF THE INVENTION

The primary aim of the invention is the improvement of damping oscillations, typically arising in a transportation means in the course of movement, due to more intensive absorption of energy of the oscillations. Another aim of the invention is to provide additional features that allow significant suppressing or avoiding auto-oscillation and resonance regimes of operation of the shock absorbers. Other aims and particular applications of the claimed invention may become apparent to one skilled in the art upon learning the present disclosure.

The aforementioned aims have been achieved by providing an inventive shock absorber that generally comprises a sleeve, a cylindrical piston with a seal attached to the cylindrical surface of piston with two side surfaces, a rod coupled with the piston, a piston cap closing the sleeve on the piston's side, and a rod cap closing the sleeve on the rod's side. The piston and rod move within the sleeve overcoming resistance of oil/gas cross-flows from one sleeve's chamber to the other, friction between the seal and the sleeve's walls, and friction between the rod and a seal mounted in the rod cap. The proposed shock absorber allows increasing the resistance offered to the movement of piston thereby improving the efficiency of damping. This is achieved by providing a number of narrowing/widening necks arranged on the sleeve's internal walls within regions adjoined to the caps. Different embodiments combine features conditioned by various diameter differences for the necks, etc. Several embodiments introduce asymmetry in the design of shock absorber and thereby insure suppressing/avoiding auto-oscillation and resonance regimes.

BRIEF DESCRIPTION OF DRAWINGS OF THE INVENTION

Figure 5:
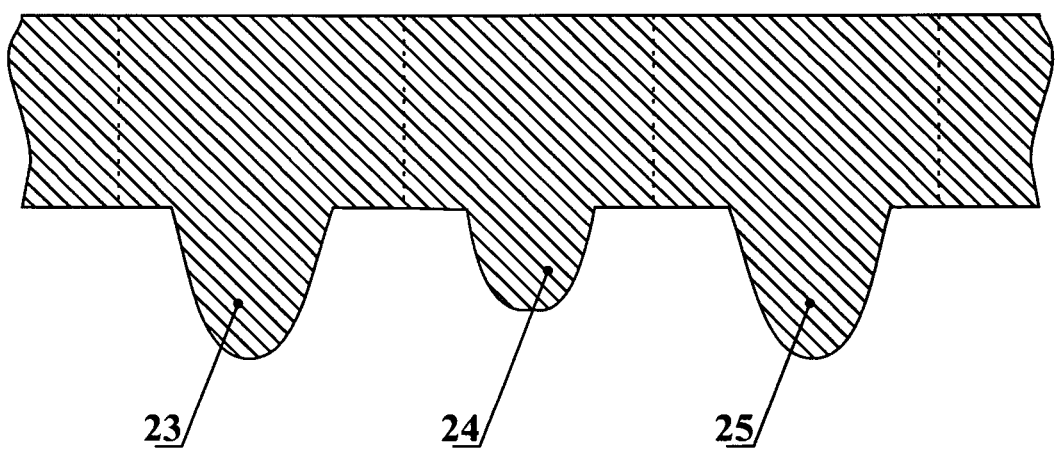
Figure 6:
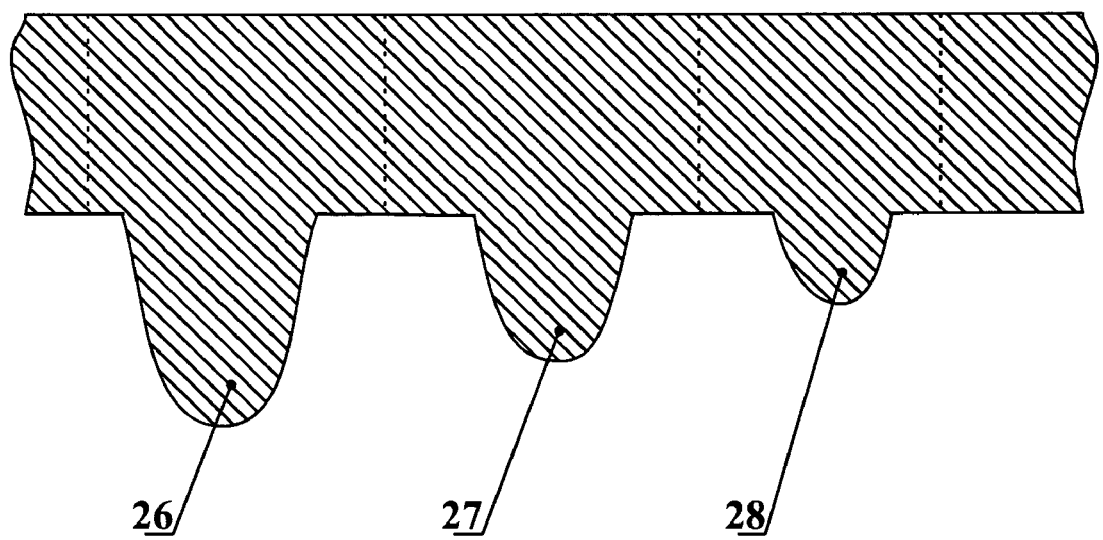
Figure 7:
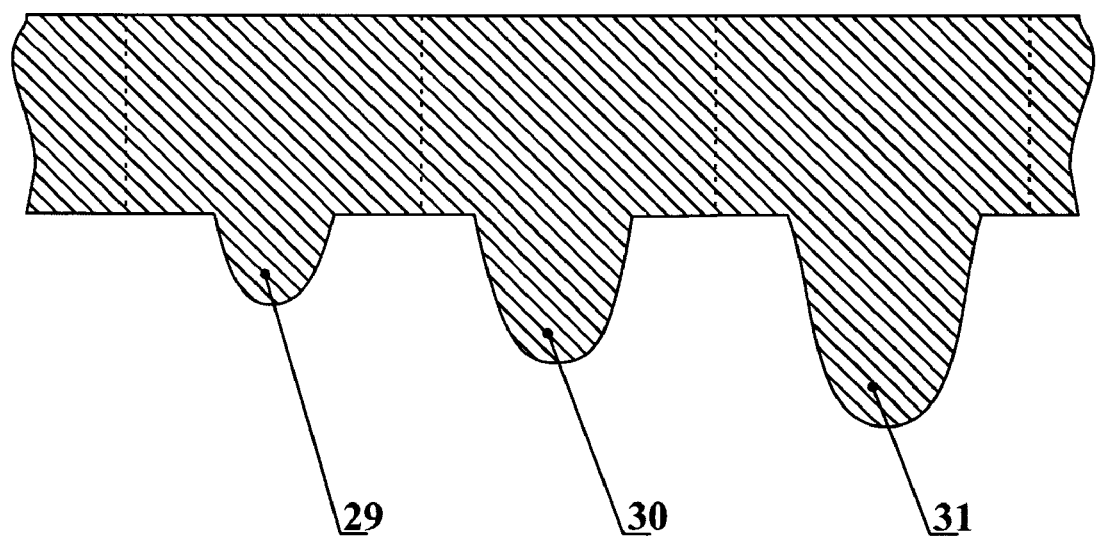

FIGS. 5, 6, and 7 show detail elements of the longitudinal cross-section of the sleeve; a number of dashed lines are shown in FIGS. 5, 6, and 7 which dashed lines represent boundaries between corresponding sleeve surface sections.

Figure 8:
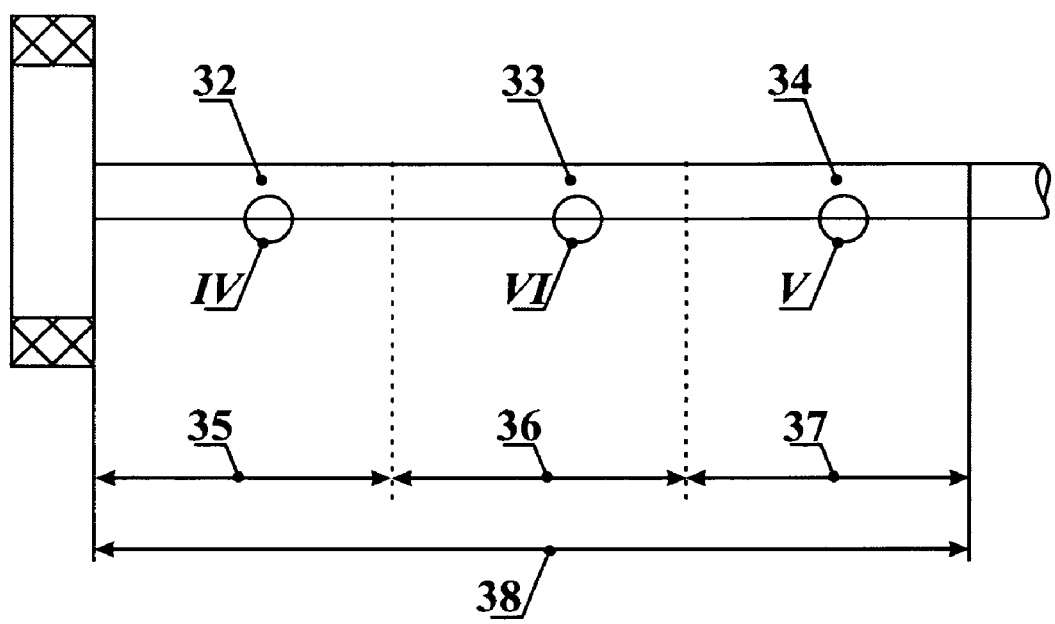

FIG. 8 shows a longitudinal cross-sectional view of the rod; the rod is divided into three rod sections IV, V and VI.

Figure 9:
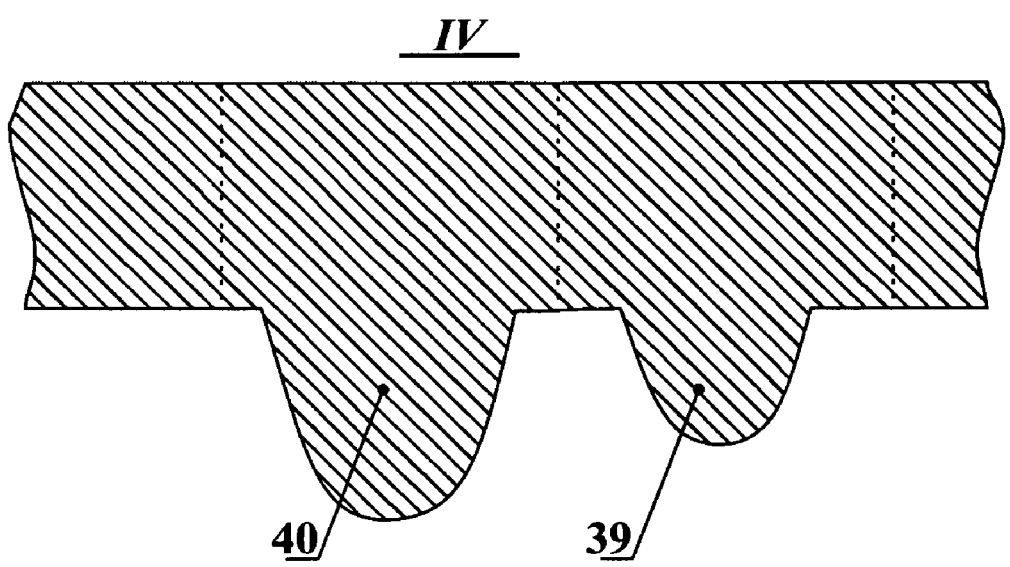
Figure 10:
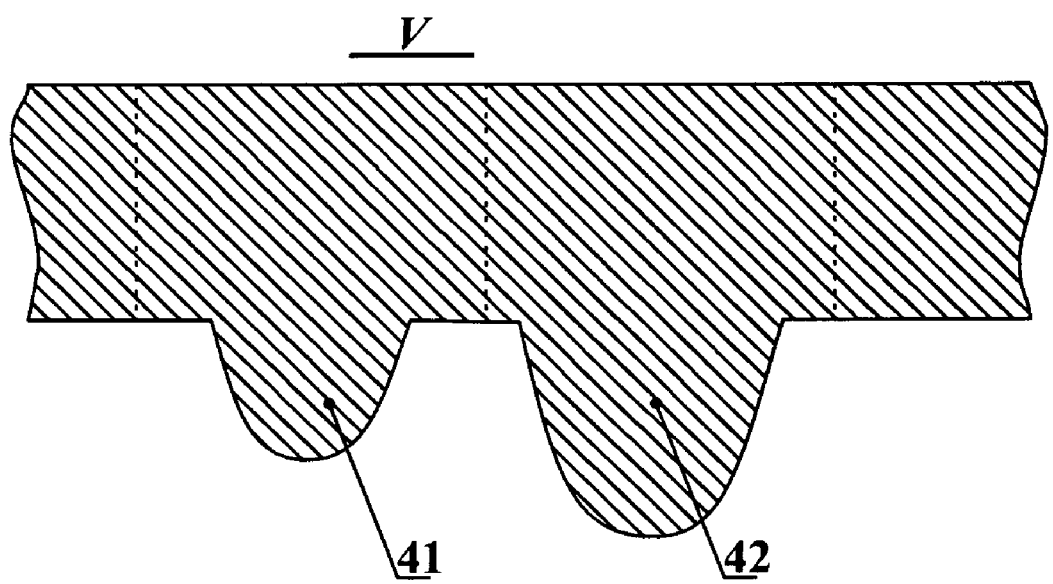
Figure 11:
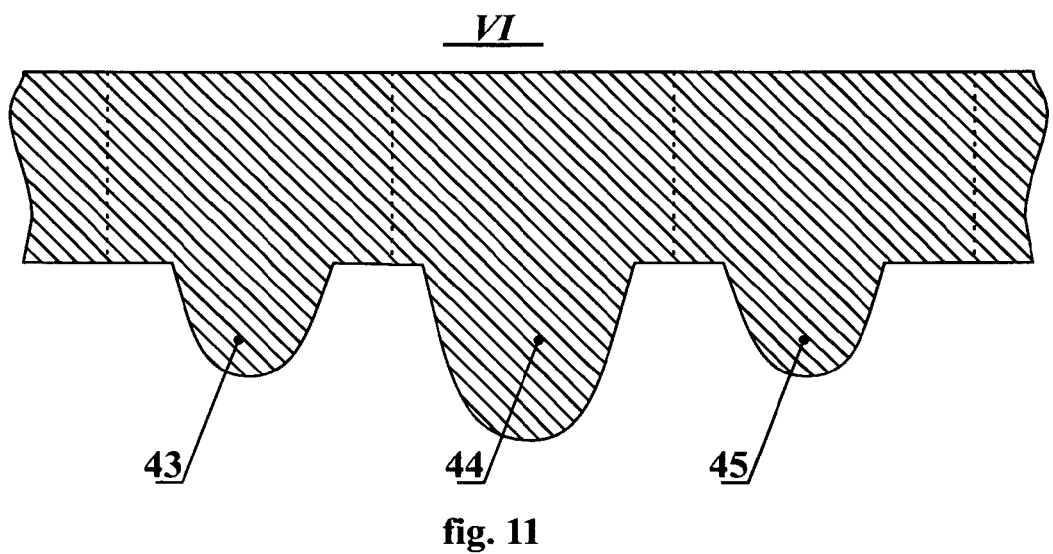

FIGS. 9, 10, and 11 show detail elements of the three respective sections IV, V and VI shown in FIG. 8; dashed lines represent boundaries between corresponding rod sections.

Figure 12:
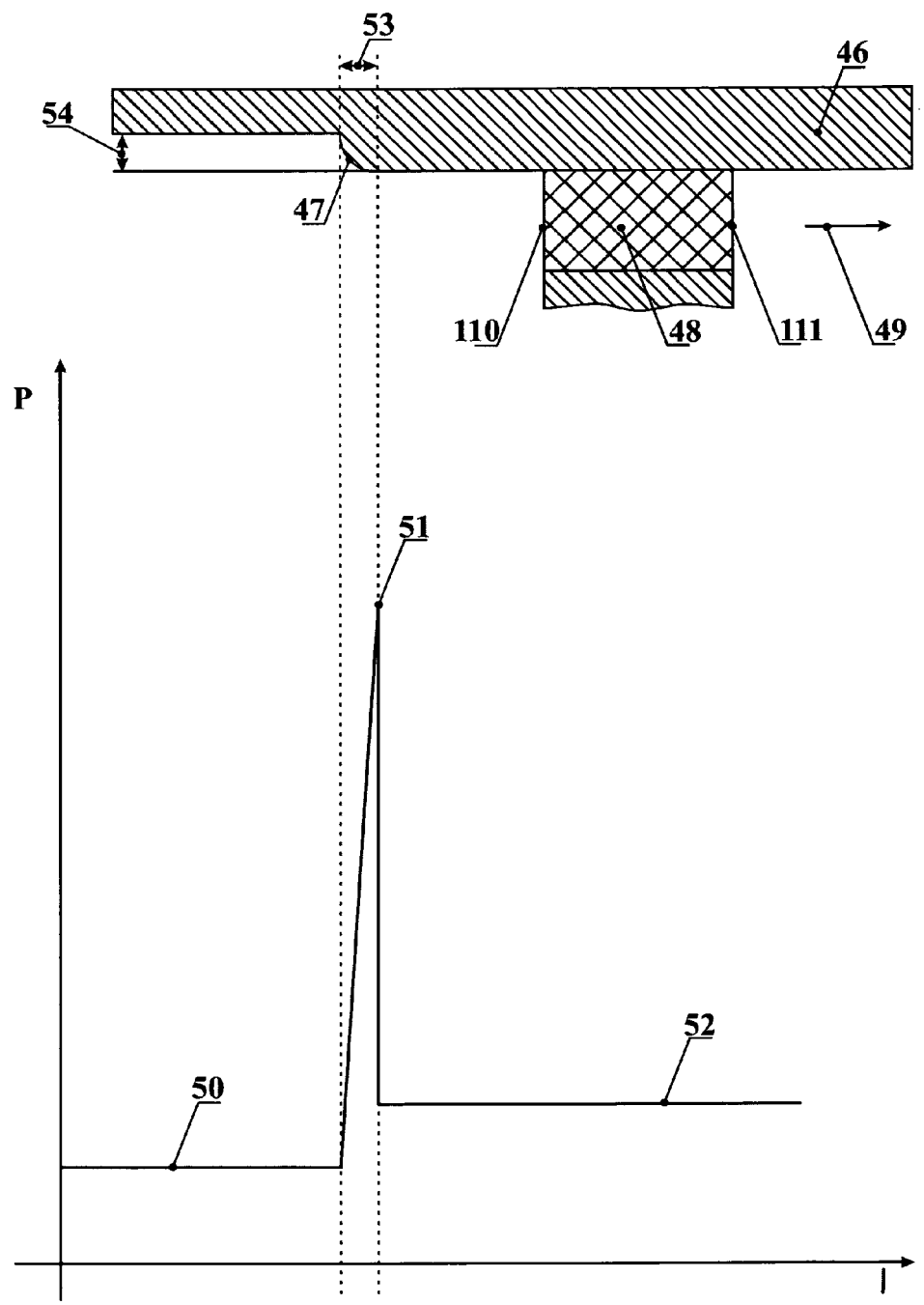

FIG. 12 shows a graph of force 'P' (counteracting the movement of the piston in the sleeve) as dependency upon coordinate '1' for the right lateral surface 111 of a seal 48 of the piston, wherein the sleeve 46 represents a sleeve of the prototype.

Figure 13:
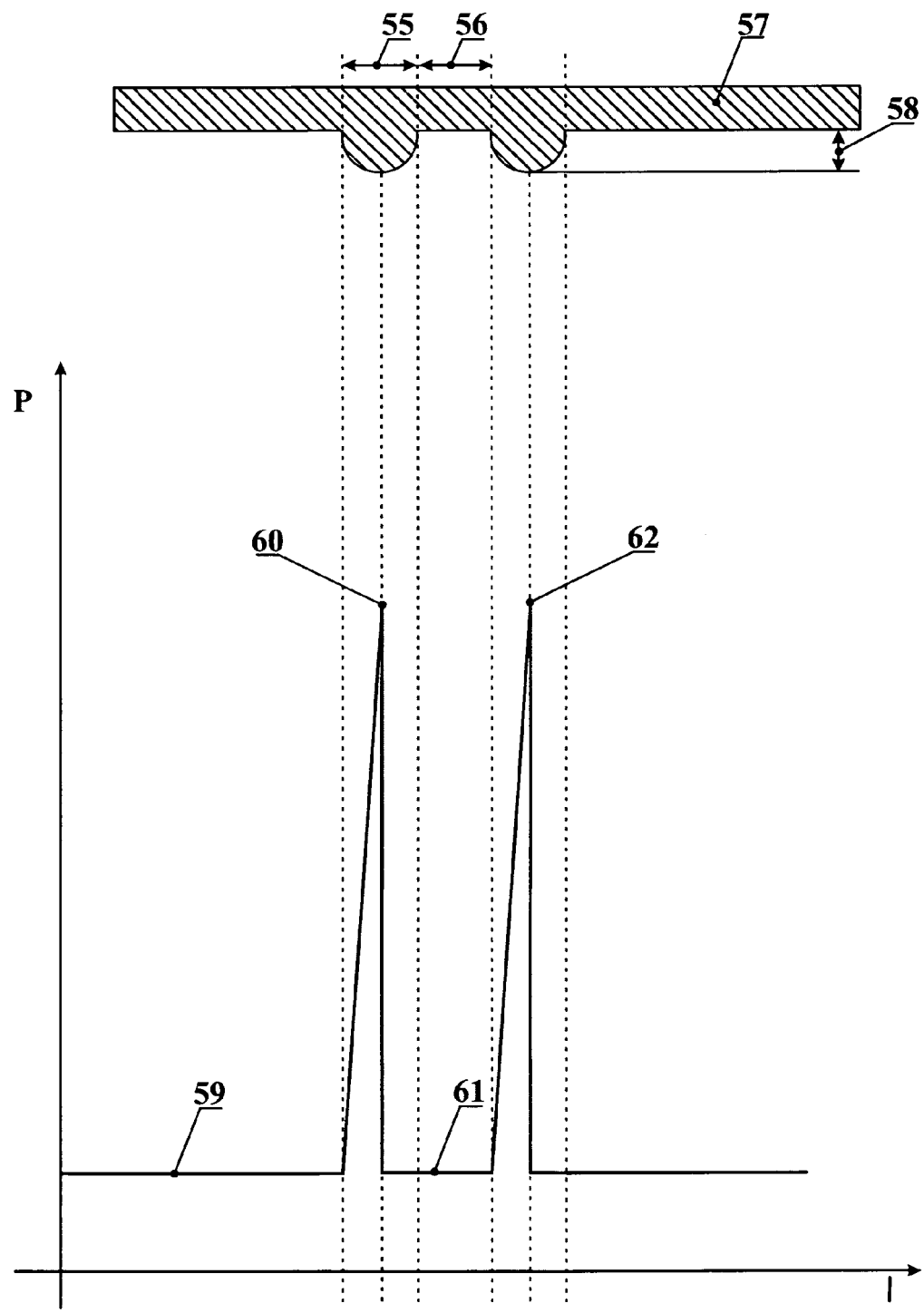

FIG. 13 shows a graph of force 'P' (counteracting the movement of the piston in the sleeve) as dependency upon coordinate 'l' for the right lateral surface of a seal of the piston; the sleeve has two sections with reduced inner diameters, which sections are divided by a boundary; the boundary is formed as an element having a cross-sectional shape of a semicircle.

Figure 14:
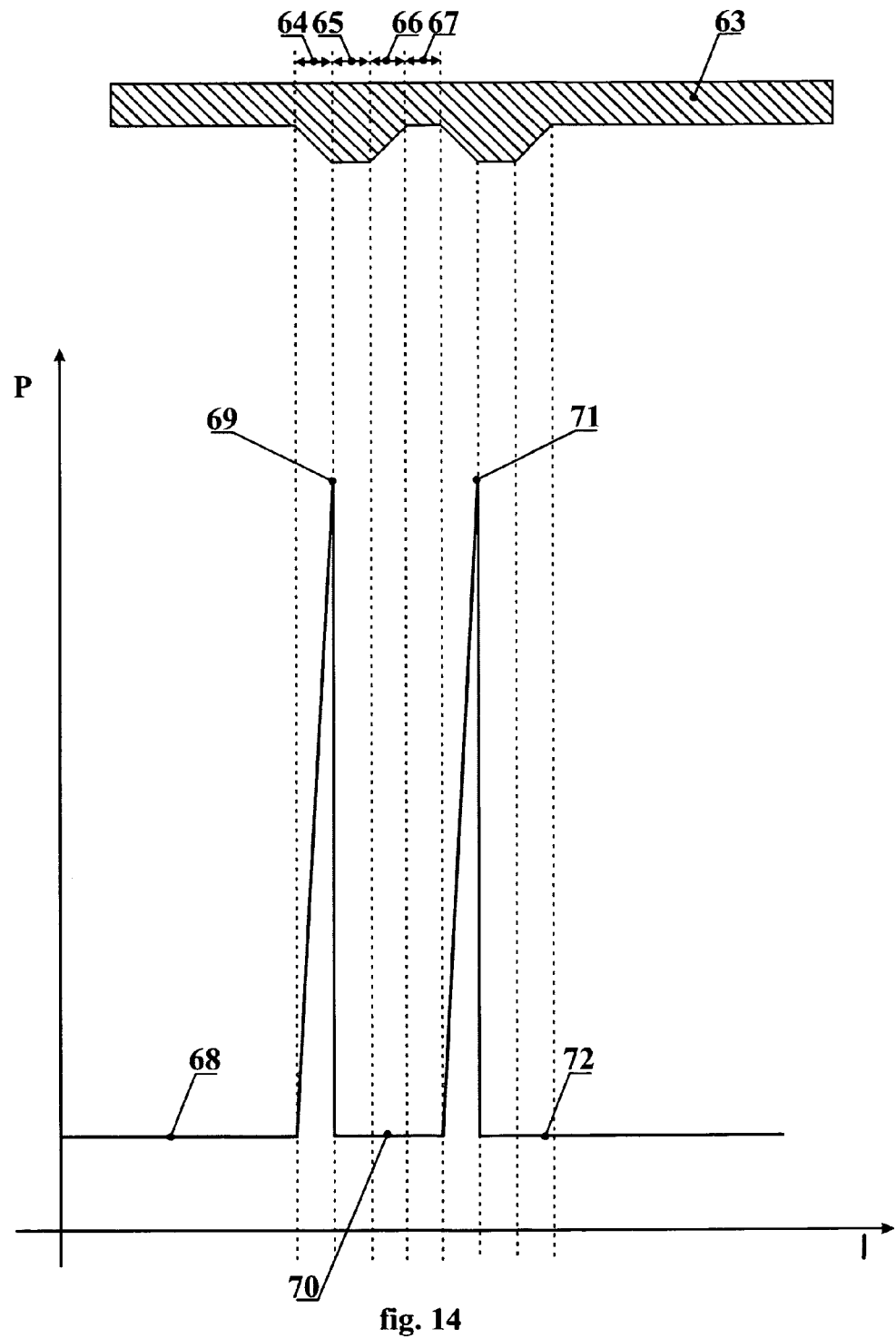

FIG. 14 shows a graph of force 'P' (counteracting the movement of the piston in the sleeve) as dependency upon coordinate 'l' for the right lateral surface of a seal of the piston; the sleeve has two sections with reduced inner diameters, which sections are divided by a boundary; the boundary is formed as an element having a cross-sectional shape of at least a portion of a trapezium.

Figure 15:
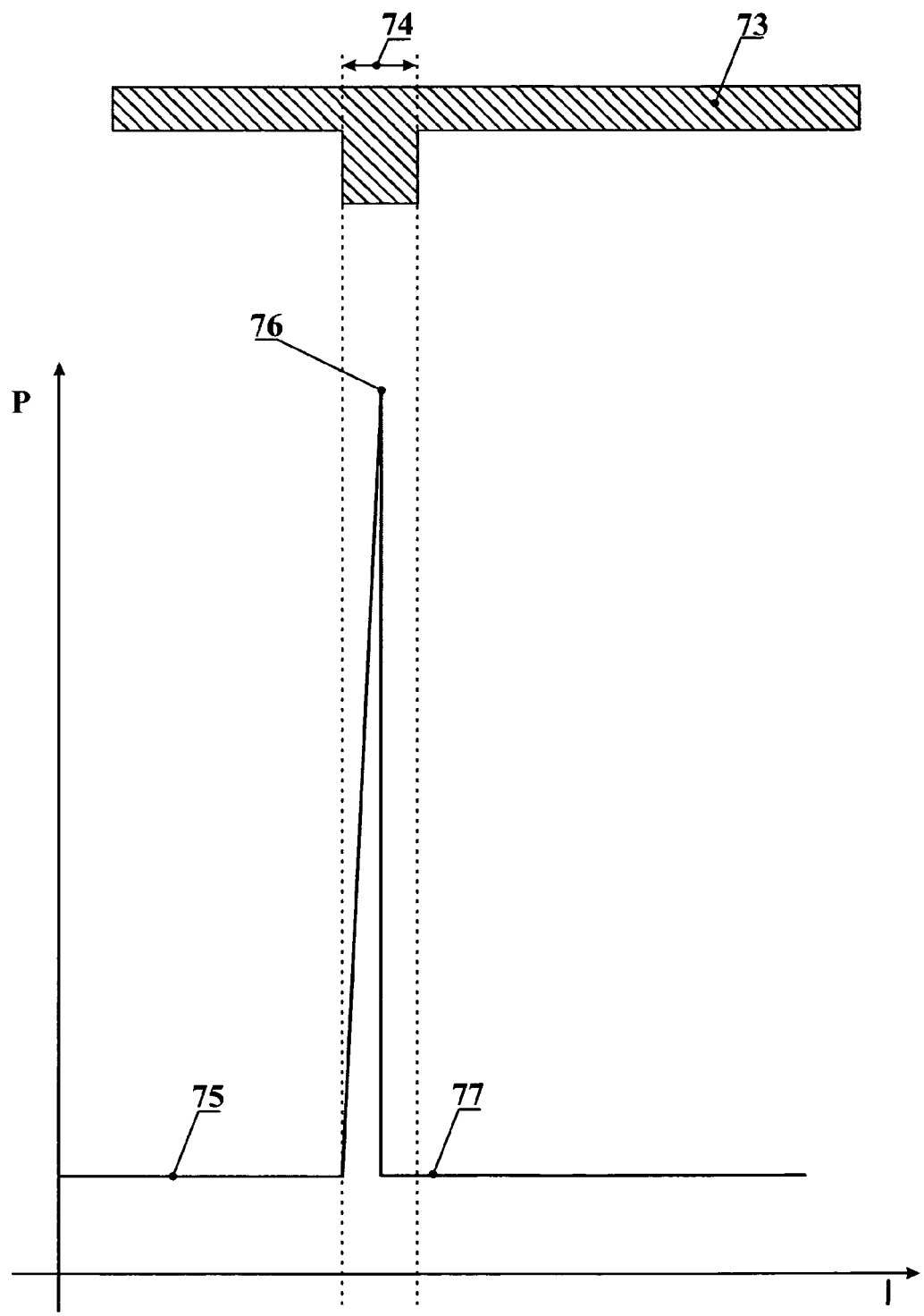

FIG. 15 shows a graph of force 'P' (counteracting the movement of the piston in the sleeve) as dependency upon coordinate 'l' for the right lateral surface of a seal of the piston; the sleeve has a section with a reduced inner diameter, which section has a boundary; the boundary is formed as an element having a cross-sectional shape of at least a portion of a rectangle.

Figure 16:
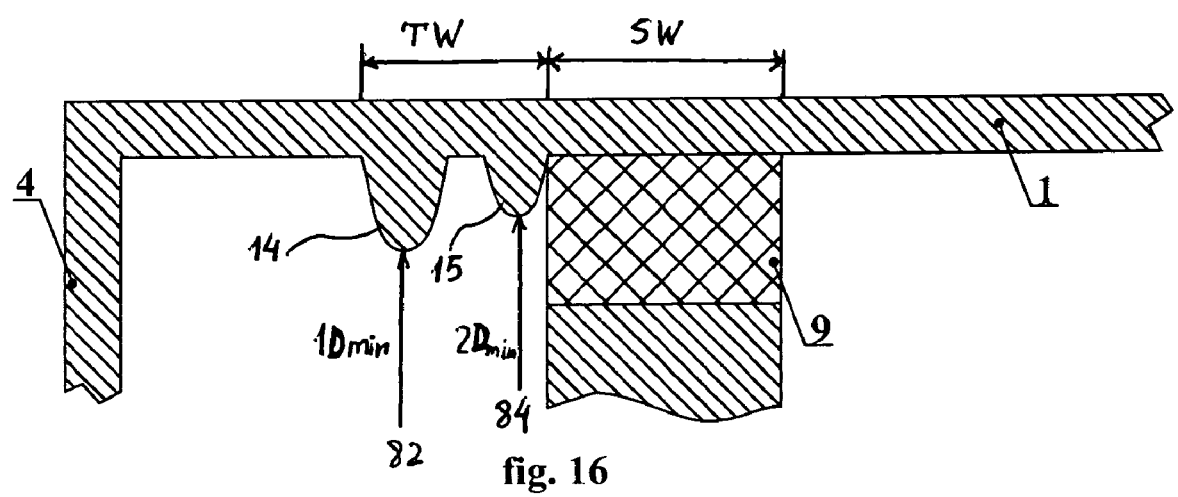

FIG. 16 shows Phase I (for a forward travel from the right to the left within the 'piston-cap-adjacent' section of the sleeve shown by an arrow) of the piston to the piston cap, wherein the piston seal does not interact with a 'small' hump (with a cross-sectional diameter 2Dmin) and a 'big' hump (with a cross-sectional diameter 1Dmin<2Dmin), according to an embodiment of the present invention. Note: Phases I-IX can also represent the respective phases of a reverse travel from the left to the right within the 'piston-cap-adjacent' section of the sleeve (corresponding arrows are not shown).

Figure 17:
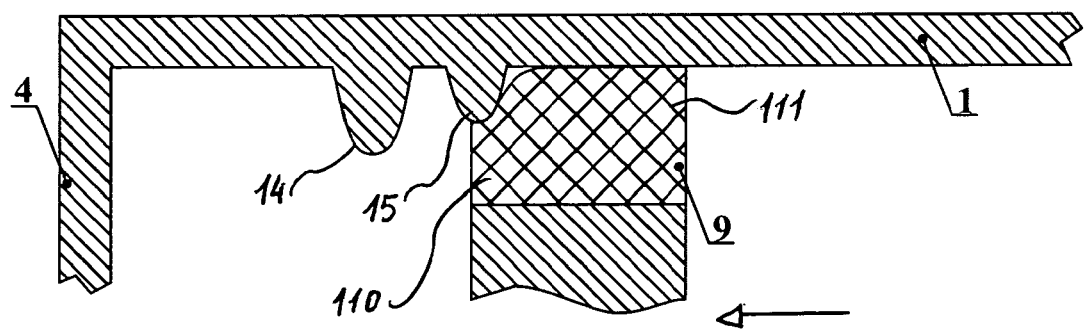
Figure 18:
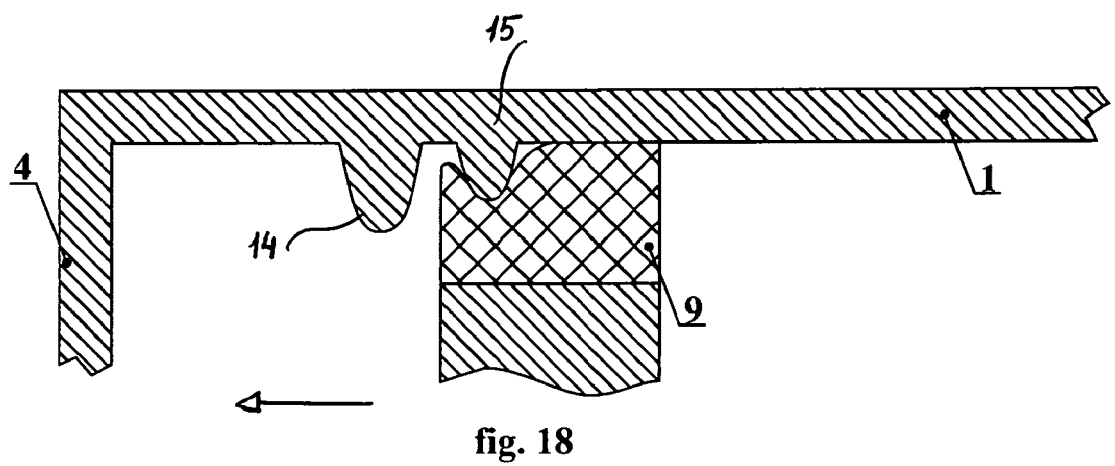

FIGS. 17 and 18 respectively show the next Phase II and Phase III of the forward travel of the piston, wherein the piston seal is overcoming the resistance offered by the small hump.

Figure 19:
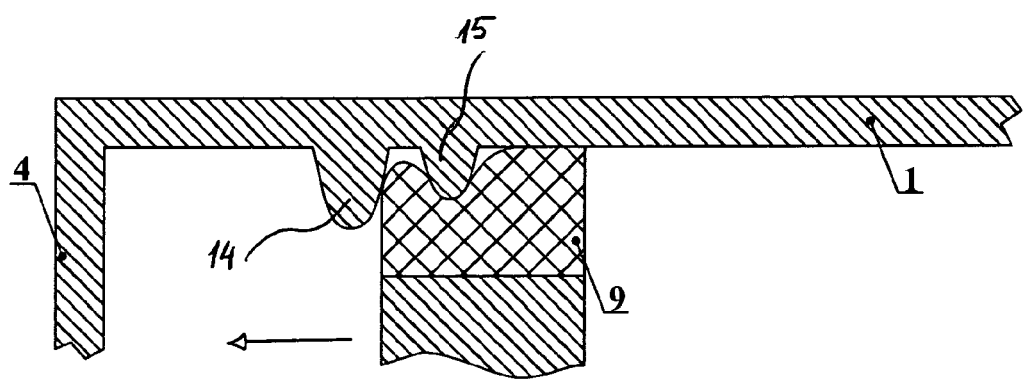

FIG. 19 shows the next Phase IV of the forward travel of the piston, wherein the piston seal is overcoming the resistance offered by the small hump and start touching the big hump.

Figure 20:
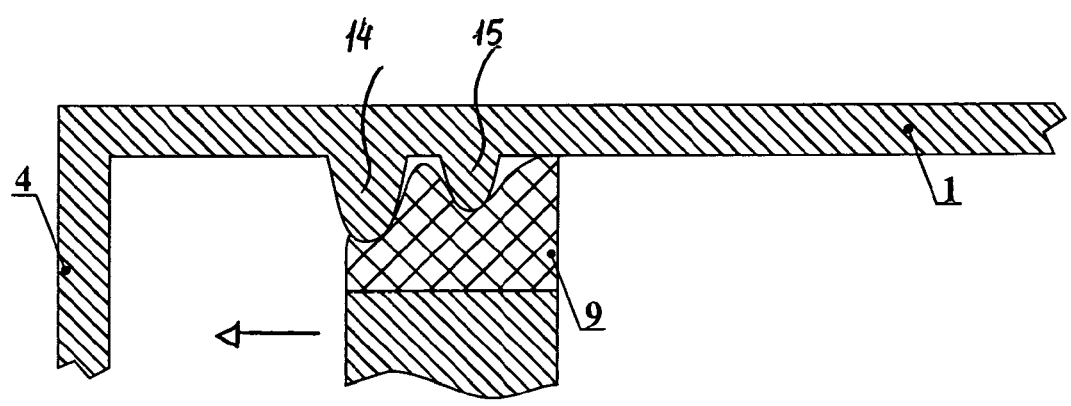

FIG. 20 shows the next Phase V of the forward travel of the piston, wherein the piston seal is overcoming the resistance offered by the small hump and the big hump.

Figure 21:
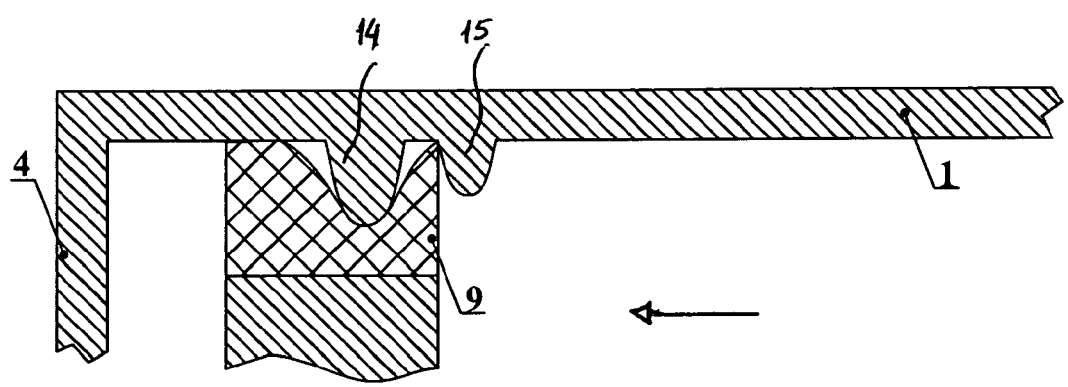
Figure 22:
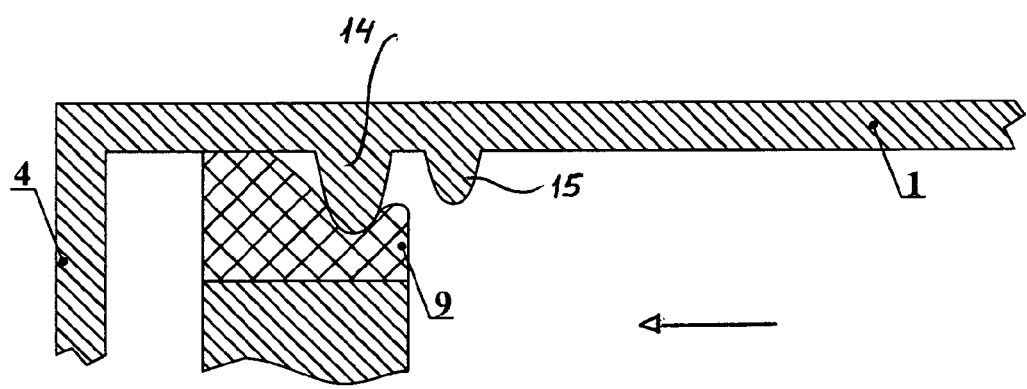

FIGS. 21 and 22 respectively show the next Phase VI and Phase VII of the forward travel of the piston, wherein the piston seal is overcoming the resistance offered by the big hump.

Figure 23:
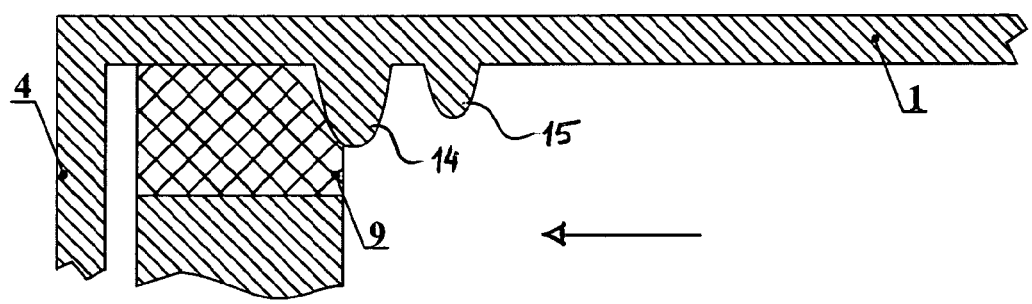

FIG. 23 shows the next Phase VIII of the forward travel of the piston, wherein the piston seal has overcome the resistance offered by the big hump.

Figure 24:
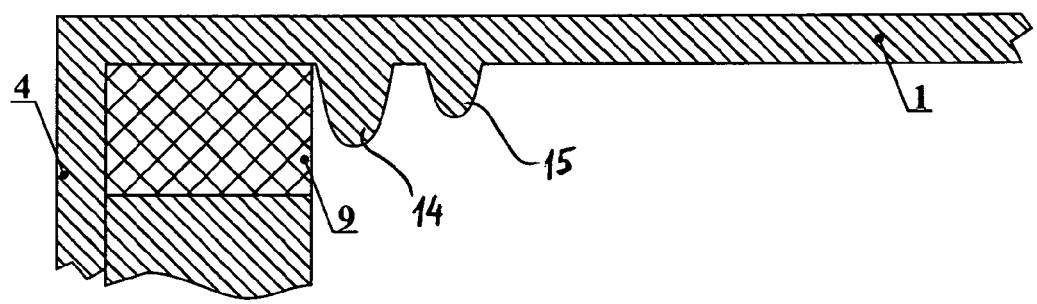

FIG. 24 shows the next Phase IX of the forward travel of the piston, wherein the piston seal is positioned between the piston cap and the humps, and does not interact with the humps.

Figure 25:
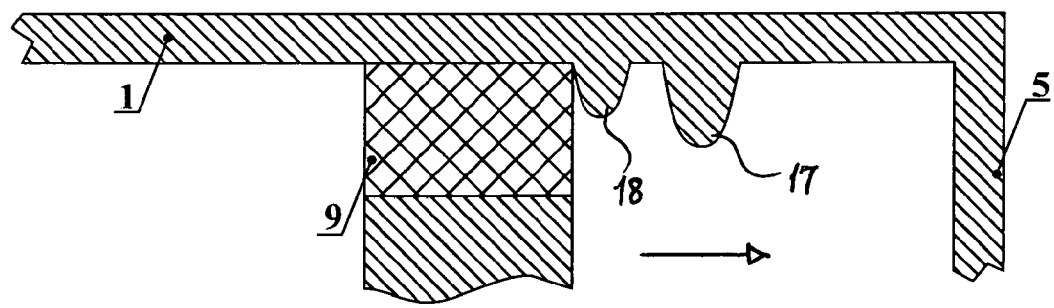

FIG. 25 shows Phase X of a reverse travel (from the left to the right within the 'rod-cap-adjacent' section of the sleeve) of the piston to the piston cap, wherein the piston seal does not interact with the small hump and with the big hump. Note: Phases X-XVIII can also represent the respective phases of a forward travel from the right to the left within the 'rod-cap-adjacent' section of the sleeve (corresponding arrows are not shown).

Figure 26:
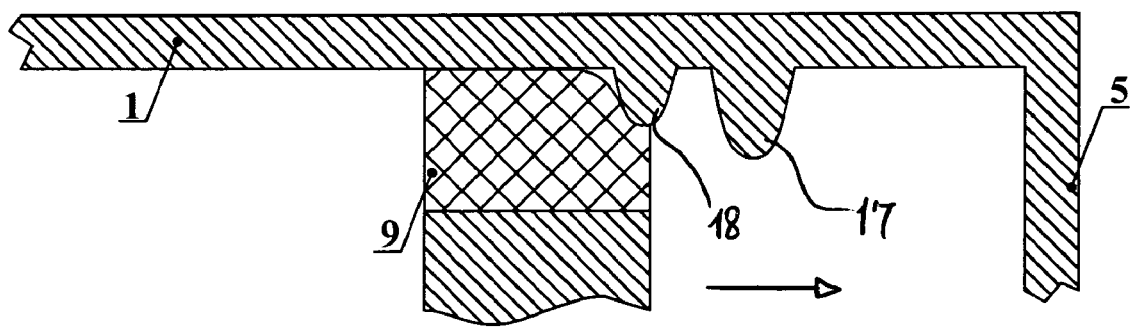
Figure 27:
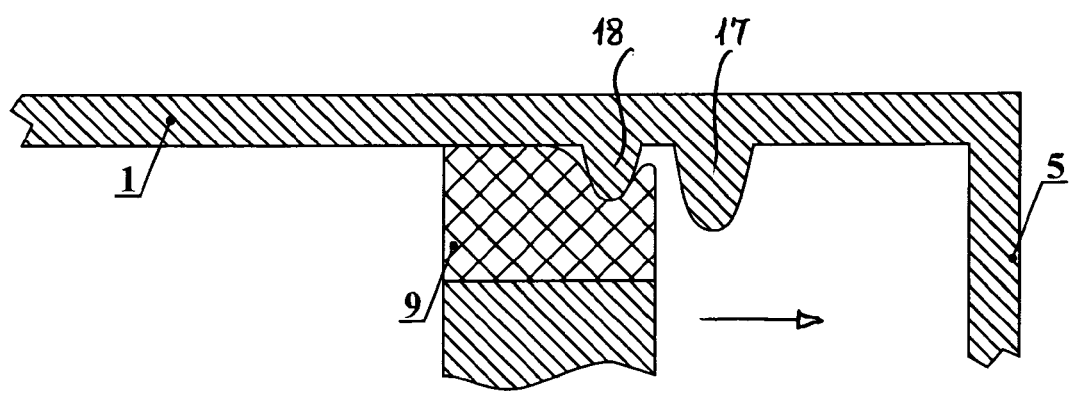

FIGS. 26 and 27 respectively show the next Phase XI and Phase XII of the reverse travel of the piston, wherein the piston seal is overcoming the resistance offered by the small hump.

Figure 28:
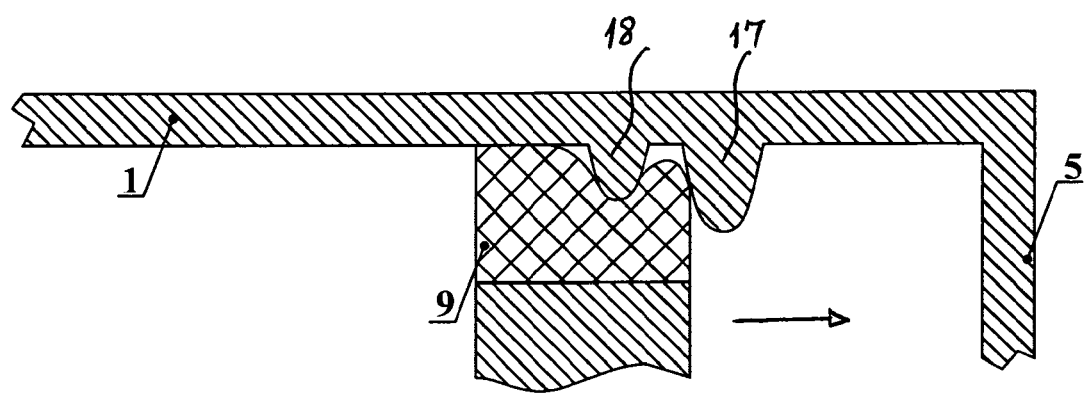

FIG. 28 shows the next Phase XIII of the reverse travel of the piston, wherein the piston seal is overcoming the resistance offered by the small hump and start touching the big hump.

Figure 29:
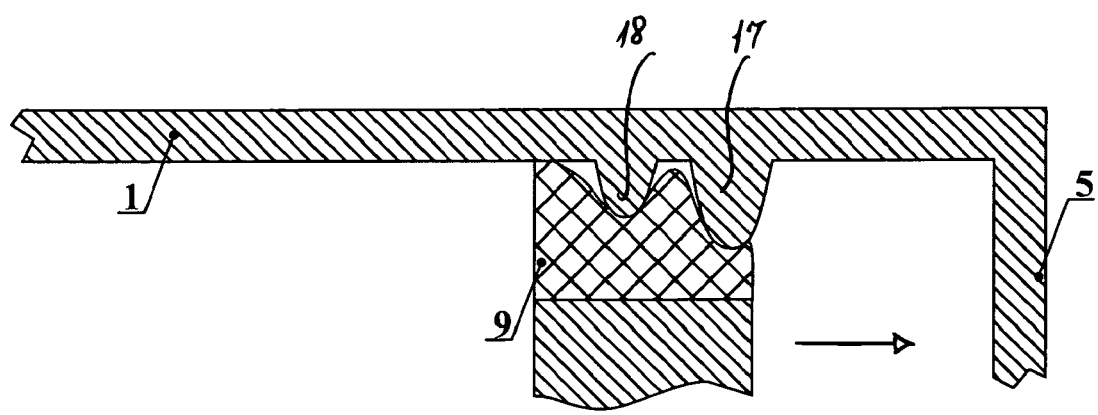

FIG. 29 shows the next Phase XIV of the reverse travel of the piston, wherein the piston seal is overcoming the resistance offered by the small hump and the big hump.

Figure 30:
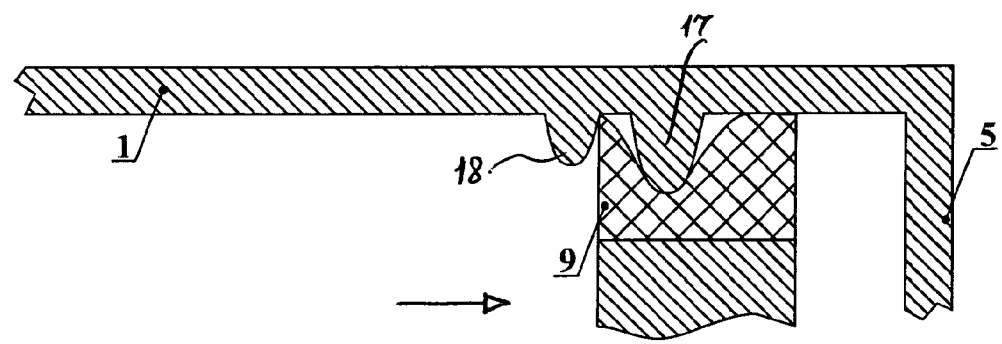
Figure 31:
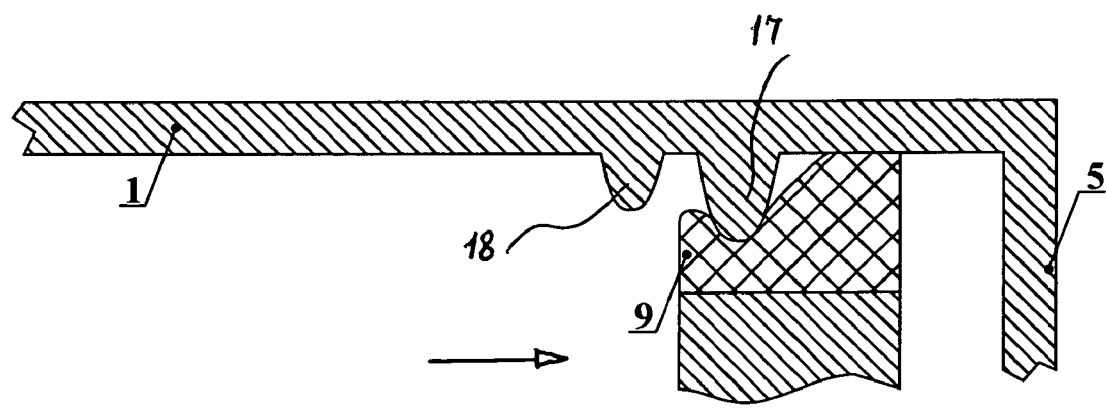

FIGS. 30 and 31 respectively show the next Phase XV and Phase XVI of the reverse travel of the piston, wherein the piston seal is overcoming the resistance offered by the big hump.

Figure 32:
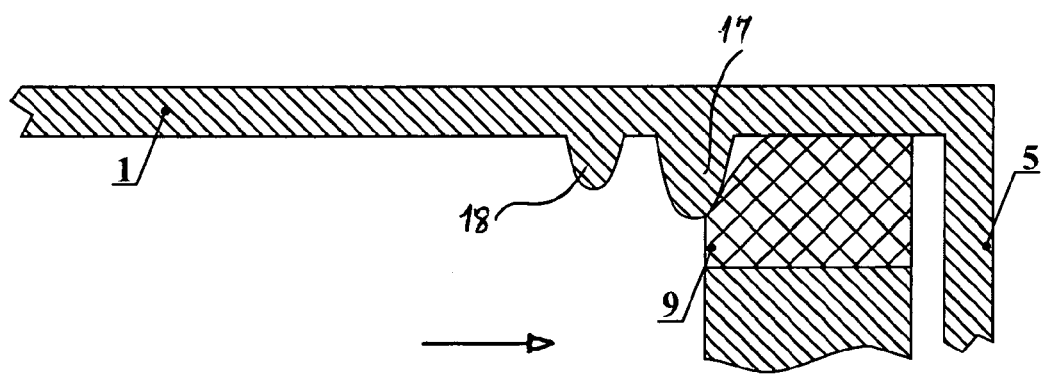

FIG. 32 shows the next Phase XVII of the reverse travel of the piston, wherein the piston seal has overcome the resistance offered by the big hump.

Figure 33:
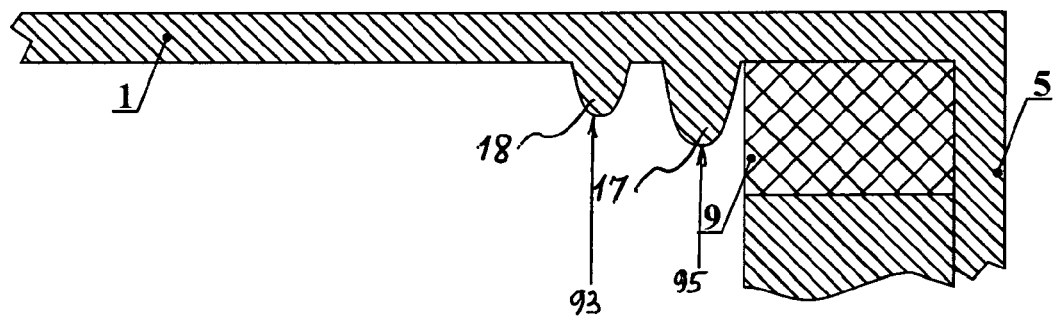

FIG. 33 shows the next Phase XVIII of the reverse travel of the piston, wherein the piston seal is positioned between the rod cap and the humps, and does not interact with the humps.

BASIC PRINCIPLES OF MAIN EMBODIMENTS OF THE INVENTION

While the invention may be susceptible to embodiment in different forms, there are described in detail herein below, specific embodiments of the present invention, with the understanding that the present disclosure is to be considered an exemplification of the principles of the invention, and is not intended to limit the invention to that as illustrated and described herein.

DEFINITIONS AND STRUCTURAL FEATURES AND RELATIONS

The structure of inventive shock absorber was published on the Internet: http://newtechnolog.narod.ru/articles/35article-.html on 17 Jun. 2010. The inventive shock absorber (damper) for a transportation means is intended for damping oscillations, typically arising in the transportation means in the course of movement, due to effective absorption of energy of the oscillations. According to a preferred embodiment shown on FIG. 1, the inventive shock absorber comprises a sleeve 1 having a longitudinal axis 112; the sleeve 1 encloses a cylindrical piston 2 (in optional embodiments, the absorber may have more than one piston), a rod 3 fixedly coupled with the piston 2; the rod 3 has a longitudinal axis that coincides with the axis 112; the rod 3 with the piston 2 are capable of accomplishing a reciprocating movement within the sleeve 1 along the longitudinal axis 112. The piston 2 is furnished with a seal 9 circumferentially attached to the lateral cylindrical surface of piston. Therefore, the piston 2 sealingly divides the interior of sleeve 1 into two chambers, whose volumes vary depending on the location of the piston 2.

The sleeve 1 has an operative surface 13 defined as an internal surface of the sleeve capable of being in contact with the seal 9 during operation of the shock absorber. The sleeve 1 is closed by a piston cap 4 on the first (left) end, and is closed by a rod cap 3 on the second (right) end of the sleeve, as depicted on FIG. 1.

The operative surface 13 is located between the cap 4 and the cap 3; the operative surface 13 is divided into three regions:

a region 6 adjoined to the piston cap 4, the region 6 has a predetermined length 10;

a middle region 7, having a predetermined length 11; and a region 8 adjoined to the rod cap 5, the region 6 has a predetermined length 12.

Preferably, the lengths 10, 11, and 12 are equal. The regions of the operative surface can further be divided into a number of sections.

Therefore, for determining characteristics of the aforementioned regions, it is necessary to define the operative surface 13, the piston cap 4, and the rod cap 5. As illustrated on FIG. 1, the rod cap 5 is a disc-shaped lid of the shock absorber that is rigidly coupled with the sleeve 1 on the right end thereof; the rod cap 5 has an orifice 78 situated substantially in the center of the rod cap, a proper sleeve seal is mounted in the orifice 78, such that the rod 3 is capable of slidely and sealingly moving therethrough. The sleeve seal is sometimes called a seal guide for the rod. Optionally, there can be several such rod caps, but this embodiment defines only one rod cap 5.

Figure 1:
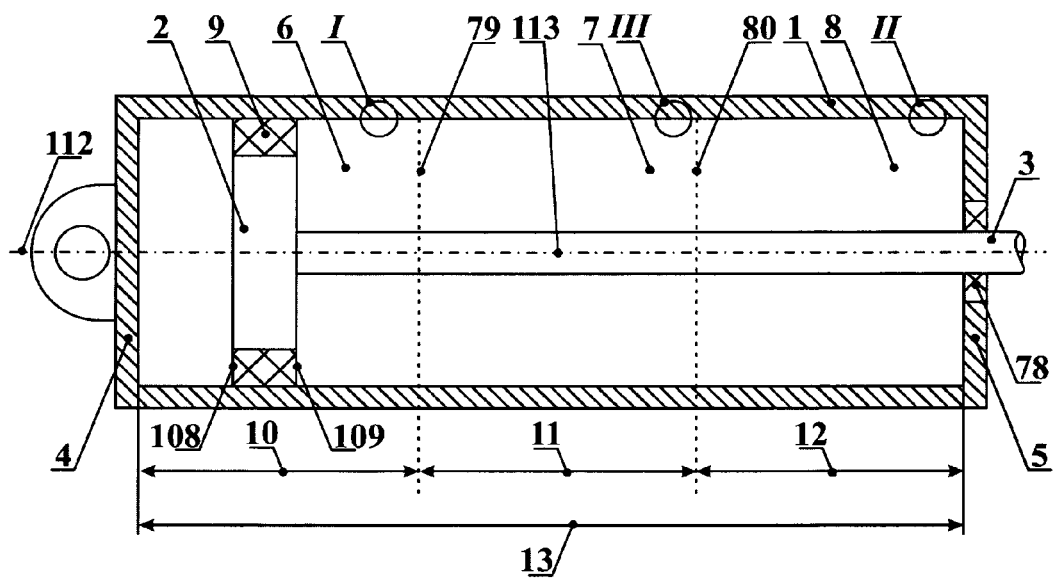
FIG. 1 shows a longitudinal cross-sectional view of the inventive shock absorber, including: a sleeve, a rod, a piston, a rod cap, and a piston cap.

As illustrated on FIG. 1, the piston cap 4 is a solid disc-shaped lid of the shock absorber that is rigidly coupled with the sleeve 1 on the left end thereof.

The sleeve 1 is the element wherein the piston moves. The operative (inner) surface of the sleeve 1 contacts or interacts with the seal 9. The sleeve 1 is characterized by an inner diameter defined for each cross-section, i.e. the area (and hence, the diameter) of each cross-section varies along the length of sleeve 1. As mentioned above, the sleeve's operative surface consists of the region adjoined to the piston cap (herein also called a 'piston-cap-adjoined' region), the region adjoined to the rod cap (herein also called a 'rod-cap-adjoined' region), and the middle region located between the latter regions. The regions, in turn, may include a number of sections.

The sleeve 1 has the aforementioned longitudinal axis 112 that coincides with the longitudinal axis of the rod 3. In this disclosure, a rectangular coordinate system is set up for the sleeve 1 in such a way that it has a beginning point at the cross-section of the piston cap 4 and the axis 112 of sleeve. Any length of a section of the sleeve 1 is measured along the axis 112 in the direction from the beginning point towards the rod cap 5.

The seal 9 has an essentially cylindrical seal operative surface that snug-fits into and slidely and sealingly cooperates with the aforesaid operative surface of sleeve 1 during the movements of the piston 2, i.e. during the operation of the shock absorber. As depicted on FIG. 1, the seal 9 also has two side surfaces situated perpendicularly to the seal operative surface: a first (left) perpendicular side seal surface 108, and a second (right) side seal surface 109. Generally, if the sleeve has a conical interior, tapered along the longitudinal axis (e.g. as described in Russian Useful Model 74602), the first and second perpendicular side seal surfaces (further also called 'seal side surfaces') may contact and interact with the operative surface of sleeve 1.

The rod 3 has an operative portion capable of sealingly contacting with the aforesaid sleeve's seal mounted in the center of orifice 78, and slidely cooperating therewith during movements of the rod 3. The operative portion of rod 3 consists of a predetermined 'piston-adjoined' rod section coupled to the piston 2, a predetermined 'free' rod section that terminates with the free end of the rod being opposite to the piston, and a middle rod section situated between the piston-adjoined and the free sections of the rod 3. In this preferred embodiment, these three sections are chosen equal.

Another rectangular coordinate system is set up for the rod 3 in such a way that it has a beginning point at the cross-section of the piston 2 and the axis 112. A middle point of the rod 3 is situated at the central point of the aforesaid middle section of the operative portion of rod 3.

THE PROBLEM AND SOLUTIONS

As mentioned above, shock absorbers mainly serve for damping the oscillations of a suspension system of transportation means. It is known that a typical shock absorber is a double-action mechanism. It damps oscillations of the suspension system at the forward travel (compression stroke) and at the reverse travel of the piston 2. This damping is usually achieved due to: resistance of compressed gas; resistance experienced by the operative liquid that overflows from one chamber of the sleeve to the other; friction of the piston's seal against the operative surface of the sleeve; and friction between the rod and the sleeve's seal (in this embodiment, mounted in the orifice 78). Commonly, the operative liquid of shock absorbers is oil of a suitable type. Alternatively, water, spirits, other hydrocarbons can be employed for special purposes.

The capability of shock absorbers to damp the oscillations is often not sufficient for effective operation of the absorbers that in turn limits the functionality of the suspension systems and the transportation means in whole. This problem has been solved with this invention due to increasing friction in the sleeve's regions adjoined to the caps.

This solution has been achieved through one of the following main design arrangements (and respective main embodiments of the invention):

(a) First Variant. The shock absorber for a transportation means comprises: a sleeve, a piston cap, a rod cap, a rod, a piston with a seal. In this variant, the shock absorber differs in that the sleeve is selected from a group consisting of: the sleeve is made so that, inside an area adjoined to the piston cap, an interior space of the sleeve along the sleeve includes at least two sections; on each of the sections the sleeve's inner diameter, being measured along a direction from the piston cap to the rod cap, decreases to a value of minimum inner diameter of the sleeve on the corresponding section, and then increases to a value of maximum inner diameter of the sleeve on the corresponding section.

In the other words, the sleeve has predetermined maximal and minimal inner diameters of each its section; within the region adjoined to the piston cap (herein also called 'a piston-cap-adjoined region'), the sleeve's operative surface includes at least two sections, wherein: a first (counting from the piston cap to the rod cap) piston-cap-adjoined section narrows to a minimal diameter of the first section and then widens to a maximal diameter of the first section, and a second (counting from the piston cap to the rod cap) piston-cap-adjoined section narrows to a minimal diameter of the second section and widens to a maximal diameter of the second section, etc.

b) Second Variant. The shock absorber for a transportation means comprises: a sleeve, a piston cap, a rod cap, a rod, a piston with a seal. In this variant, the shock absorber differs in that sleeve is made so that, inside an area adjoined to the rod cap, the interior space of the sleeve along the sleeve includes at least two sections; on each of the sections, the sleeve's inner diameter being measured along a direction from the piston cap to the rod cap, decreases to a value of minimum inner diameter of the sleeve on the corresponding section, and then increases to a value of maximum inner diameter of the sleeve on the corresponding section.

In the other words, the sleeve has predetermined maximal and minimal inner diameters of each its section; within the region adjoined to the rod cap (herein also called 'a rod-cap-adjoined region'), the sleeve's operative surface includes at least two sections, wherein: a first (counting from the piston cap to the rod cap) rod-cap-adjoined section narrows to a minimal diameter of the first section and then widens to a maximal diameter of the first section, and a second (counting from the piston cap to the rod cap) rod-cap-adjoined section narrows to a minimal diameter of the second section and widens to a maximal diameter of the second section, etc.

c) Third Variant. The shock absorber for a transportation means comprises: a sleeve, a piston cap, a rod cap, a rod, a piston with a seal. In this variant, the shock absorber differs in that the sleeve is selected from a group consisting of: the sleeve is made so that, —inside an area adjoined to the piston cap, an interior space of the sleeve along the sleeve includes at least two sections; on each of the sections the sleeve's inner diameter, being measured along a direction from the piston cap to the rod cap, decreases to a value of minimum inner diameter of the sleeve on the corresponding section, and then increases to a value of maximum inner diameter of the sleeve on the corresponding section; and —inside an area adjoined to the rod cap, the interior space of the sleeve along the sleeve includes at least two sections; on each of the sections, the sleeve's inner diameter being measured along a direction from the piston cap to the rod cap, decreases to a value of minimum inner diameter of the sleeve on the corresponding section, and then increases to a value of maximum inner diameter of the sleeve on the corresponding section.

In the other words, the sleeve has predetermined maximal and minimal inner diameters of each its section; within the region adjoined to the piston cap (also called 'piston-cap-adjoined' region), the sleeve's operative surface includes at least two piston-cap-adjoined sections, wherein: a first (counting from the piston cap to the rod cap) piston-cap-adjoined section narrows to a minimal diameter of the first piston-cap-adjoined section and then widens to a maximal diameter thereof, and a second (counting from the piston cap to the rod cap) piston-cap-adjoined section narrows to a minimal diameter of the second piston-cap-adjoined section and widens to a maximal diameter thereof, etc.; and within the region adjoined to the rod cap (also called 'rod-cap-adjoined' region), the sleeve's operative surface includes at least two sections, wherein: a first (counting from the piston cap to the rod cap) rod-cap-adjoined section narrows to a minimal diameter of the first rod-cap-adjoined section and then widens to a maximal diameter thereof, and a second (counting from the piston cap to the rod cap) rod-cap-adjoined section narrows to a minimal diameter of the second rod-cap-adjoined section and then widens to a maximal diameter thereof, etc.

The aforementioned main embodiments (a), (b), and (c) provide the following results:

significant increasing the force counteracting the movements of piston in the regions adjoined to the caps;

deploying the seal side surfaces during the forward and reverse travels of the piston within the region adjoined to the piston cap;

deploying the seal side surfaces during the forward and reverse travels of the piston within the region adjoined to the rod cap;

cushioning the impact and reducing the overload during the forward travel of piston towards the piston cap through the narrowing portions (annular humps) of the sleeve's inner surface; and cushioning the impact and reducing the overload during the reverse travel of piston towards the rod cap through the narrowing portions (annular humps) of the sleeve's inner surface.

DESCRIPTION OF PREFERRED EMBODIMENTS OF THE INVENTION

In the three aforementioned main embodiments, the first and second sections (either of the piston-cap-adjoined region or of the rod-cap-adjoined regions) can generally be located adjacently (i.e. next to each other) or separately (i.e. divided by one or more intermediate sections of the same region). Accordingly, there are a number of more specific embodiments of the present invention described below. Each of the specific embodiments allows for intensifying the damping of oscillations and introduces asymmetry into the structure of shock absorber that in turn allows for avoiding an auto-oscillation or a resonance regime (both negatively affecting the damping process) of oscillations during movements of the transportation means.

The auto-oscillation regime is such wherein the oscillations do not decay, since supported by an external source of energy (e.g. the oscillating transportation means). Auto-oscillations can exist in any system, provided that there would be no external alternating forces applied to the system, and amplitudes of such oscillations are determined only by properties of the system. The pattern and properties (frequency, amplitude, shape, etc.) of auto-oscillations are determined by design peculiarities of the shock absorber. Asymmetrical or non-uniform structure of the shock absorber in general allows avoiding the auto-oscillations.

Resonance is characterized by a sharp increase of the amplitude of impelled oscillations of a system (in this case including the shock absorber and the transportation means) that occurs where the impelling frequency (i.e. the frequency of the external energy source) approaches certain frequency values (called 'resonant frequencies') determined by properties of the system. It is known that when the impelling frequency coincides with the natural (internal) frequency of the oscillating system, resonance will occur, and a sharp increase of the oscillation amplitude, as a consequence of the resonance, will be observed. Asymmetrical or non-uniform structure of the shock absorber allows essentially avoiding the resonance regime as well.

Below is a description of a group of 23 specific embodiments that introduce particular asymmetrical design arrangements of the sleeve's operative surface according to the present invention.

(1i) The sleeve's operative surface comprises the aforementioned piston-cap-adjoined region includes: a first piston-cap-adjoined section most proximate to the piston cap having a first section minimal diameter, and a second piston-cap-adjoined section remote from the piston cap having a second section minimal diameter; wherein the second section minimal diameter is greater than the first section minimal diameter. The first and second piston-cap-adjoined sections can be situated adjacently or separately.

(2i) The piston-cap-adjoined region includes: a first piston-cap-adjoined section adjacent to the piston cap having a first section minimal diameter, and a second piston-cap-adjoined section remote from the piston cap having a second section minimal diameter; wherein the second section minimal diameter is greater than the first section minimal diameter. The first and second piston-cap-adjoined sections can be situated adjacently or separately.

(3i) The rod-cap-adjoined region includes: a first rod-cap-adjoined section most proximate to the rod cap having a first section minimal diameter, and a second rod-cap-adjoined section remote from the rod cap having a second section minimal diameter; wherein the second section minimal diameter is greater than the first section minimal diameter. The first and second rod-cap-adjoined sections can be situated adjacently or separately.

(4i) The rod-cap-adjoined region includes: a first rod-cap-adjoined section adjacent to the rod cap having a first section minimal diameter, and a second rod-cap-adjoined section remote from the rod cap having a second section minimal diameter; wherein the second section minimal diameter is greater than the first section minimal diameter. The first and second rod-cap-adjoined sections can be situated adjacently or separately.

(5i) The piston-cap-adjoined region includes: a first piston-cap-adjoined section most proximate to the piston cap having a first section minimal diameter, and a second piston-cap-adjoined section remote from the piston cap having a second section minimal diameter; wherein the second section minimal diameter is less than the first section minimal diameter. The first and second piston-cap-adjoined sections can be situated adjacently or separately.

(6i) The piston-cap-adjoined region includes: a first piston-cap-adjoined section adjacent to the piston cap having a first section minimal diameter, and a second piston-cap-adjoined section remote from the piston cap having a second section minimal diameter; wherein the second section minimal diameter is less than the first section minimal diameter. The first and second piston-cap-adjoined sections can be situated adjacently or separately.

(7i) The rod-cap-adjoined region includes: a first rod-cap-adjoined section most proximate to the rod cap having a first section minimal diameter, and a second rod-cap-adjoined section remote from the rod cap having a second section minimal diameter; wherein the first section minimal diameter is greater than the second section minimal diameter. The first and second rod-cap-adjoined sections can be situated adjacently or separately.

(8i) The rod-cap-adjoined region includes: a first rod-cap-adjoined section adjacent to the rod cap having a first section minimal diameter, and a second rod-cap-adjoined section remote from the rod cap having a second section minimal diameter; wherein the first section minimal diameter is greater than the second section minimal diameter. The first and second rod-cap-adjoined sections can be situated adjacently or separately.

(9i) The piston-cap-adjoined region includes: a first piston-cap-adjoined section most proximate to the piston cap having a variable diameter decreasing in the direction from the piston cap along the sleeve axis to a first section minimal diameter and, after a first predetermined point, increasing to a first section maximal diameter; a second piston-cap-adjoined section most remote from the piston cap having a variable diameter decreasing in the direction from the piston cap along the sleeve axis to a second section minimal diameter and, after a second predetermined point, increasing to a second section maximal diameter; and a third piston-cap-adjoined section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is less than either the first or the second section minimal diameters. The third piston-cap-adjoined section can be situated adjacently or separately in relation to the first or/and the second piston-cap-adjoined sections.

(10i) The rod-cap-adjoined region includes: a first rod-cap-adjoined section most proximate to the rod cap having a variable diameter decreasing in the direction from the piston cap along the sleeve axis to a first section minimal diameter and, after a first predetermined point, increasing to a first section maximal diameter; a second rod-cap-adjoined section most remote from the rod cap having a variable diameter decreasing in the direction from the piston cap along the sleeve axis to a second section minimal diameter and, after a second predetermined point, increasing to a second section maximal diameter; and a third rod-cap-adjoined section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is less than either the first or the second section minimal diameters. The third rod-cap-adjoined section can be situated adjacently or separately in relation to the first or/and the second rod-cap-adjoined sections.

(11i) The middle region of the operative surface of sleeve includes: a first middle section most proximate to the piston cap having a variable diameter decreasing in the direction from the piston cap along the sleeve axis to a first section minimal diameter and, after a first predetermined point, increasing to a first section maximal diameter; a second middle section most remote from the piston cap having a variable diameter decreasing in the direction from the piston cap along the sleeve axis to a second section minimal diameter and, after a second predetermined point, increasing to a second section maximal diameter; and a third middle section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is less than either the first or the second section minimal diameters. The third middle section can be situated adjacently or separately in relation to the first or/and the second middle sections.

(12i) The piston-cap-adjoined region includes: a first piston-cap-adjoined section most proximate to the piston cap having a variable diameter decreasing in the direction from the piston cap along the sleeve axis to a first section minimal diameter and, after a first predetermined point, increasing to a first section maximal diameter; a second piston-cap-adjoined section most remote from the piston cap having a variable diameter decreasing in the direction from the piston cap along the sleeve axis to a second section minimal diameter and, after a second predetermined point, increasing to a second section maximal diameter; and a third piston-cap-adjoined section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is greater than either the first or the second section minimal diameters. The third piston-cap-adjoined section can be situated adjacently or separately in relation to the first or/and the second piston-cap-adjoined sections.

(13i) The rod-cap-adjoined region includes: a first rod-cap-adjoined section most proximate to the rod cap having a variable diameter decreasing in the direction from the piston cap along the sleeve axis to a first section minimal diameter and, after a first predetermined point, increasing to a first section maximal diameter; a second rod-cap-adjoined section most remote from the rod cap having a variable diameter decreasing in the direction from the piston cap along the sleeve axis to a second section minimal diameter and, after a second predetermined point, increasing to a second section maximal diameter; and a third rod-cap-adjoined section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is less than either the first or the second section minimal diameters. The third rod-cap-adjoined section can be situated adjacently or separately in relation to the first or/and the second rod-cap-adjoined sections.

(14i) The middle region of the operative surface of sleeve includes: a first middle section most proximate to the piston cap having a variable diameter decreasing in the direction from the piston cap along the sleeve axis to a first section minimal diameter and, after a first predetermined point, increasing to a first section maximal diameter; a second middle section most remote from the piston cap having a variable diameter decreasing in the direction from the piston cap along the sleeve axis to a second section minimal diameter and, after a second predetermined point, increasing to a second section maximal diameter; and a third middle section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is greater than either the first or the second section minimal diameters. The third middle section can be situated adjacently or separately in relation to the first or/and the second middle sections.

(15i) The piston-cap-adjoined region includes: a first piston-cap-adjoined section most proximate to the piston cap having a variable diameter decreasing in the direction from the piston cap along the sleeve axis to a first section minimal diameter and, after a first predetermined point, increasing to a first section maximal diameter; a second piston-cap-adjoined section most remote from the piston cap having a variable diameter decreasing in the direction from the piston cap along the sleeve axis to a second section minimal diameter and, after a second predetermined point, increasing to a second section maximal diameter; and a third piston-cap-adjoined section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is less than the first section minimal diameter and is greater than the second section minimal diameter. The third piston-cap-adjoined section can be situated adjacently or separately in relation to the first or/and the second piston-cap-adjoined sections.

(16i) The rod-cap-adjoined region includes: a first rod-cap-adjoined section most proximate to the rod cap having a variable diameter decreasing in the direction from the piston cap along the sleeve axis to a first section minimal diameter and, after a first predetermined point, increasing to a first section maximal diameter; a second rod-cap-adjoined section most remote from the rod cap having a variable diameter decreasing in the direction from the piston cap along the sleeve axis to a second section minimal diameter and, after a second predetermined point, increasing to a second section maximal diameter; and a third rod-cap-adjoined section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is greater than the first section minimal diameter and is less than the second section minimal diameter. The third rod-cap-adjoined section can be situated adjacently or separately in relation to the first or/and the second rod-cap-adjoined sections.

(17i) The middle region of the operative surface of sleeve includes: a first middle section most proximate to the piston cap having a variable diameter decreasing in the direction from the piston cap along the sleeve axis to a first section minimal diameter and, after a first predetermined point, increasing to a first section maximal diameter; a second middle section most remote from the piston cap having a variable diameter decreasing in the direction from the piston cap along the sleeve axis to a second section minimal diameter and, after a second predetermined point, increasing to a second section maximal diameter; and a third middle section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is less than the first section minimal diameter and greater than the second section minimal diameter. The third middle section can be situated adjacently or separately in relation to the first or/and the second middle sections.

(18i) The piston-cap-adjoined region includes: a first piston-cap-adjoined section most proximate to the piston cap having a variable diameter decreasing in the direction from the piston cap along the sleeve axis to a first section minimal diameter and, after a first predetermined point, increasing to a first section maximal diameter; a second piston-cap-adjoined section most remote from the piston cap having a variable diameter decreasing in the direction from the piston cap along the sleeve axis to a second section minimal diameter and, after a second predetermined point, increasing to a second section maximal diameter; and a third piston-cap-adjoined section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is greater than the first section minimal diameter and is less than the second section minimal diameter. The third piston-cap-adjoined section can be situated adjacently or separately in relation to the first or/and the second piston-cap-adjoined sections.

(19i) The rod-cap-adjoined region includes: a first rod-cap-adjoined section most proximate to the rod cap having a variable diameter decreasing in the direction from the piston cap along the sleeve axis to a first section minimal diameter and, after a first predetermined point, increasing to a first section maximal diameter; a second rod-cap-adjoined section most remote from the rod cap having a variable diameter decreasing in the direction from the piston cap along the sleeve axis to a second section minimal diameter and, after a second predetermined point, increasing to a second section maximal diameter; and a third rod-cap-adjoined section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is less than the first section minimal diameter and is greater than the second section minimal diameter.

The third rod-cap-adjoined section can be situated adjacently or separately in relation to the first or/and the second rod-cap-adjoined sections.

(20i) The middle region of the operative surface of sleeve includes: a first middle section most proximate to the piston cap having a variable diameter decreasing in the direction from the piston cap along the sleeve axis to a first section minimal diameter and, after a first predetermined point, increasing to a first section maximal diameter; a second middle section most remote from the piston cap having a variable diameter decreasing in the direction from the piston cap along the sleeve axis to a second section minimal diameter and, after a second predetermined point, increasing to a second section maximal diameter; and a third middle section situated essentially between the first and the second sections and having a variable diameter decreasing in the direction from the piston cap along the sleeve axis to a third section minimal diameter and, after a third predetermined point, increasing to a third section maximal diameter; wherein the third section minimal diameter is greater than the first section minimal diameter and is less than the second section minimal diameter. The third middle section can be situated adjacently or separately in relation to the first or/and the second middle sections.

(21i) Mechanical research for hydro-cylinders and hydraulic shock absorbers has shown that elastic deformation of a compressed piston can be ranged up to 100 micro-meters. According to experimental results, the piston-cap-adjoined region of sleeve 1 includes: a first piston-cap-adjoined section proximate to the piston cap having a first section minimal diameter, and a second piston-cap-adjoined section remote from the piston cap having a second section minimal diameter; wherein the first section minimal diameter is less than the second section minimal diameter. The difference between the two diameters should range from 3 to 100 micro-meters.

(22i) The rod-cap-adjoined region of sleeve 1 includes: a first rod-cap-adjoined section proximate to the piston cap having a first section minimal diameter, and a second rod-cap-adjoined section remote from the piston cap having a second section minimal diameter; wherein the first section minimal diameter is less than the second section minimal diameter. According to experimental results, the difference between the two diameters should range from 3 to 100 micro-meters.

(23i) The piston-cap-adjoined region of sleeve 1 includes: a first piston-cap-adjoined section proximate to the piston cap having a first section minimal diameter ($D_p$), and a second piston-cap-adjoined section remote from the piston cap having a second section minimal diameter; the rod-cap-adjoined region of sleeve 1 includes: a third rod-cap-adjoined section proximate to the piston cap having a third section minimal diameter ($D_{ch}$), and a fourth rod-cap-adjoined section remote from the piston cap having a fourth section minimal diameter; the first section minimal diameter is less than the second section minimal diameter; the third section minimal diameter is less than the fourth section minimal diameter. According to experimental results, the absolute difference between $D_p$ and $D_{ch}$ should range from 5 to 50 micro-meters, i.e.:

$$|D_p - D_{ch}| = k,$$

wherein k ranges from 5 to 50 micro-meters.

Below is a description of a group of 8 specific embodiments that introduce particular design arrangements of the rod of the inventive shock absorber, which arrangements represent a further development of the present invention and broaden the scope thereof. These design arrangements produce an additional new and unexpected result of suppressing or avoiding the auto-oscillation and resonance regimes due to novel features that add asymmetry relatively to the central point of the middle section of rod, which features are augmented to the structure of inventive shock absorbers.

FIG. 8 shows the piston 2, the rod 3, and the rod operative portion 38 (limited by the rod cap 3 at the very left position of piston 2). The operative portion 38 consists of a region 32 ('piston-adjoined' region) having a length 35, a region 33 ('middle' region) having a length 36, and a region 34 ('free end connected' region, i.e. adjoined to the free and of the rod 3) having a length 37. In this embodiment, the lengths 35, 36, and 37 are equal.

(1j) The shock absorber comprises the rod wherein: —the piston-adjoined region includes two sections each of which has an outer diameter of rod, which outer diameter increases along the longitudinal axis of rod to a predetermined maximal diameter of the section and then decreases to a predetermined minimal diameter of the section; and —the free-end-connected region including two sections each of which has an outer diameter of rod, which outer diameter increases to a predetermined maximal diameter of the section and then decreases along the longitudinal axis of rod to a predetermined minimal diameter of the section. The rod can be so arranged that the two section of each of the mentioned regions may be situated adjacently or separately in relation to each other.

(2j) The shock absorber comprises the rod wherein: —the piston-adjoined region includes two sections: a first section having an outer diameter of rod that increases along the longitudinal axis of rod to a predetermined first maximal diameter of the section and then decreases along the longitudinal axis of rod to a predetermined minimal diameter of the section; —a second section having an outer diameter of rod that increases to a predetermined second maximal diameter of the section and then decreases to a predetermined minimal diameter of the section; and the first maximal diameter is greater than the second maximal diameter. The rod can be so arranged that the first and second sections may be situated adjacently or separately in relation to each other.

(3j) The shock absorber comprises the rod wherein: —the free-end-connected region includes two sections: a first section, proximate to the free end, having an outer diameter of rod that increases along the longitudinal axis of rod to a predetermined first maximal diameter of the section and then decreases along the longitudinal axis of rod to a predetermined minimal diameter of the section; —a second section, remote from the free end, having an outer diameter of rod that increases along the longitudinal axis of rod to a predetermined second maximal diameter of the section and then decreases to a predetermined minimal diameter of the section; and the first maximal diameter is greater than the second maximal diameter. The rod can be so arranged that the first and second sections may be situated adjacently or separately in relation to each other.

(4j) The shock absorber comprises the rod wherein: —the piston-adjoined region includes three sections: a first section proximate to the piston, a second section remote from the piston, and a middle section situated between the first and second sections; each of the sections has an outer diameter of rod, which outer diameter increases along the longitudinal axis of rod to a predetermined maximal (respectively: a first, second, and third) diameter of the section and then decreases along the longitudinal axis of rod to a predetermined minimal diameter of the section; and the third maximal diameter is greater than the first or the second maximal diameter. The rod can be so arranged that the first, second, and third sections may be situated adjacently or separately in relation to each other.

(5j) The shock absorber comprises the rod wherein: —the free-end-connected region includes three sections: a first section proximate to the piston, a second section remote from the piston, and a middle section situated between the first and second sections; each of the sections has an outer diameter of rod, which outer diameter increases along the longitudinal axis of rod to a predetermined maximal (respectively: a first, second, and third) diameter of the section and then decreases along the longitudinal axis of rod to a predetermined minimal diameter of the section; and the third maximal diameter is greater than the first or the second maximal diameter. The rod can be so arranged that the first, second, and third sections may be situated adjacently or separately in relation to each other.

(6j) The shock absorber comprises the rod wherein: —the middle region includes three sections: a first section proximate to the piston, a second section remote from the piston, and a middle section situated between the first and second sections; each of the sections has an outer diameter of rod, which outer diameter increases along the longitudinal axis of rod to a predetermined maximal (respectively: a first, second, and third) diameter of the section and then decreases along the longitudinal axis of rod to a predetermined minimal diameter of the section; and the third maximal diameter is greater than the first or the second maximal diameter. The rod can be so arranged that the first, second, and third sections may be situated adjacently or separately in relation to each other.

(7j) Mechanical research of seals mounted in the orifices 78 (shown on FIG. 1) of hydro-cylinders and hydraulic shock absorbers has shown that elastic deformation of the seal can amount up to 10 micrometers. In this regard, the shock absorber may comprise the rod wherein: —the piston-adjoined region includes two sections: a first section, proximate to the piston, having an outer diameter of rod that increases along the longitudinal axis of rod to a predetermined first maximal diameter of the section and then decreases along the longitudinal axis of rod to a predetermined minimal diameter of the section; —a second section, remote from the piston, having an outer diameter of rod that increases along the longitudinal axis of rod to a predetermined second maximal diameter of the section and then decreases along the longitudinal axis of rod to a predetermined minimal diameter of the section; and the first maximal diameter is greater than the second maximal diameter. The difference between the first and second diameters should preferably range from 3 to 100 micrometers.

(8j) The shock absorber may comprise the rod wherein: —the free-end-connected region includes two sections: a first section, proximate to the piston, having an outer diameter of rod that increases along the longitudinal axis of rod to a predetermined first maximal diameter of the section and then decreases along the longitudinal axis of rod to a predetermined minimal diameter of the section; —a second section, remote from the piston, having an outer diameter of rod that increases along the longitudinal axis of rod to a predetermined second maximal diameter of the section and then decreases along the longitudinal axis of rod to a predetermined minimal diameter of the section; and the first maximal diameter is greater than the second maximal diameter. The difference between the first and second diameters should preferably range from 3 to 100 micrometers.

DETAIL DESCRIPTION OF EXAMPLARY EMBODIMENTS OF THE INVENTION

In an exemplary embodiment shown on FIG. 1, the inventive shock absorber comprises: a sleeve 1; a piston 2 having a longitudinal axis 112, a rod 3 coupled with the piston 2 so that the piston and rod are capable of joined traveling in the sleeve along the axis 112; a piston cap 4 closing the sleeve from the piston side; a rod cap 5 closing the sleeve from the other side opposite to the piston, the rod cap 5 includes an orifice 78 made essentially in the center thereof; wherein the piston includes a seal 9 circumferentially surrounding its cylindrical surface and sealingly snug-fitting into the sleeve 1, and the rod cap 5 includes a seal mounted in the orifice 78 so that the rod 3 is capable of sealingly sliding in the sleeve 1.

The sleeve's region 6 (a portion of the operative area adjacent to the piston cap 4) has a length 10 (FIG. 1). A cross-section fraction of the region 6 is depicted on FIG. 2. The region 6 comprises two sections: a first section located between points 86 and 87, and a second section located between points 87 and 88. On the first section, the inner diameter of sleeve decreases from a diameter 81 to a first minimal diameter 82 (the narrowest minimum is denoted by reference numeral 14), and then increases to a first maximal diameter 83 of the section. On the second section, the inner diameter of sleeve decreases from the diameter 83 to a second minimal diameter 84 (the narrowest minimum is denoted by reference numeral 15), and then increases to a second maximal diameter 85 of the section. The boundaries of the sections are illustrated on FIG. 2 by dash lines crossing the boundary points 86, 87, and 88.

In the above embodiment, the first minimal diameter 82 is less than the second minimal diameter 84. The difference between the two diameters is equal to a double amount of a length denoted by reference numeral 16 on FIG. 2. The two sections are adjacent in this embodiment.

The sleeve's region 8 (a portion of the operative area adjacent to the rod cap 5) has a length 12 (FIG. 1). A cross-section fraction of the region 8 is depicted on FIG. 3. The region 8 comprises two sections: a first section located between points 89 and 90, and a second section located between points 90 and 91. On the first section, the inner diameter of sleeve decreases from a diameter 92 to a first minimal diameter 93 (the narrowest minimum is denoted by reference numeral 18), and then increases to a first maximal diameter 94 of the section. On the second section, the inner diameter of sleeve decreases from the diameter 94 to a second minimal diameter 95 (the narrowest minimum is denoted by reference numeral 17), and then increases to a second maximal diameter 96 of the section. The boundaries of the sections are illustrated on FIG. 3 by dash lines crossing the boundary points 89, 90, and 91.

In the above embodiment, the first minimal diameter 93 is less than the second minimal diameter 95. The difference between the two diameters is equal to a double amount of a length denoted by reference numeral 19 on FIG. 3. The two sections are adjacent in this embodiment.

Figure 4:
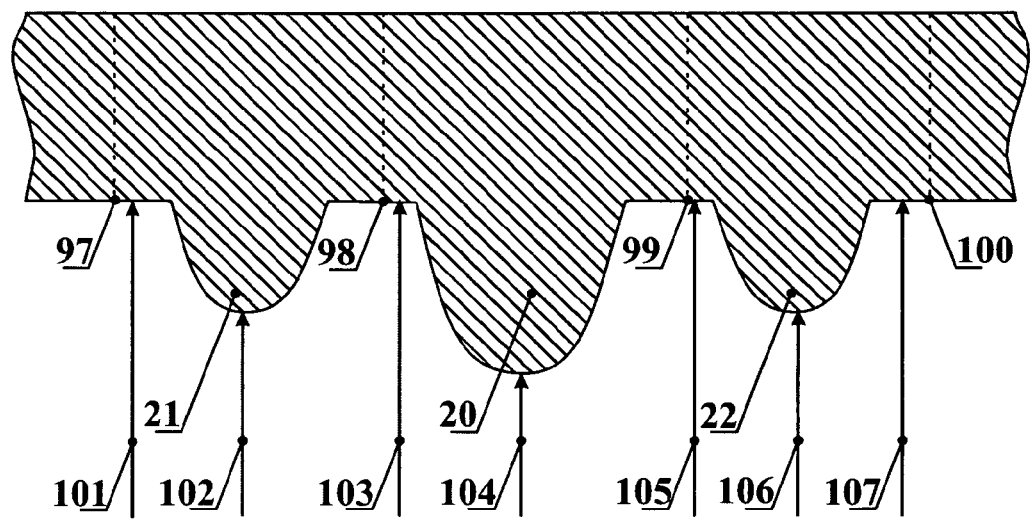
FIG. 4 shows a detail view of a middle region III of the inner surface of sleeve; four dashed lines are shown in FIG. 4, the dashed lines represent boundaries between three sleeve surface sections in the region III.

In the embodiment depicted on FIG. 4, the inventive shock absorber comprises the sleeve, whose operative surface includes a middle region (illustrated on FIG. 1 and denoted by reference numeral 7), which middle region consists of three sections: —a first section, most proximate to the piston cap 4, located between the points 97 and 98, having the narrowest minimum denoted by reference numeral 21; —a second section —middle section —located between the points 98 and 99, having the narrowest minimum denoted by reference numeral 20; and a third section, most remote from the piston cap 4, located between the points 99 and 100, having the narrowest minimum denoted by reference numeral 22.

In the embodiment shown on FIG. 4, on the first section, the sleeve diameter decreases from a diameter 101 to a first minimal diameter 102 and then increases to a first maximal diameter 103 of this section. On the second section, the sleeve diameter decreases from the diameter 103 to a second minimal diameter 104 and then increases to a second maximal diameter 105 of this section. On the third section, the sleeve diameter decreases from the diameter 105 to a third minimal diameter 106 and then increases to a third maximal diameter 107 of this section.

In the above embodiment, on the middle (second) section located between the points 98 and 99, the diameter 104 is less than the diameter 106 and is also less than the diameter 102.

In the embodiment shown on FIG. 5, the inventive shock absorber comprises the sleeve, whose operative surface includes the piston-cap-adjoined region (illustrated on FIG. 1 and denoted by reference numeral 6), which region consists of three sections: —a first section, most proximate to the piston cap 4, including the narrowest minimum denoted by reference numeral 23; —a second (middle) section, including the narrowest minimum denoted by reference numeral 24; and a third section, most remote from the piston cap 4, including the narrowest minimum denoted by reference numeral 25. The minimal diameter of the second (middle) section is greater than the minimal diameter of the first section, or than the minimal diameter of the third section. The boundaries between these sections are illustrated by dashed lines.

Another embodiment can also be explained with the help of FIG. 5. Accordingly, the inventive shock absorber comprises the sleeve, whose operative surface includes the rod-cap-adjoined region (illustrated on FIG. 1 and denoted by reference numeral 8), which region consists of three sections: —a first section, most proximate to the rod cap 5, including the narrowest minimum denoted by reference numeral 25; —a second (middle) section, including the narrowest minimum denoted by reference numeral 24; and a third section, most remote from the rod cap 5, including the narrowest minimum denoted by reference numeral 23. The minimal diameter of the second (middle) section is greater than the minimal diameter of the first section, or than the minimal diameter of the third section. The boundaries between these sections are illustrated by dashed lines.

In the embodiment shown on FIG. 6, the inventive shock absorber comprises the sleeve, whose operative surface includes the piston-cap-adjoined region (illustrated on FIG. 1 and denoted by reference numeral 6), which region consists of three sections: —a first section, most proximate to the piston cap 4, including the narrowest minimum denoted by reference numeral 26; —a second (middle) section, including the narrowest minimum denoted by reference numeral 27; and a third section, most remote from the piston cap 4, including the narrowest minimum denoted by reference numeral 28. The minimal diameter of the second (middle) section is greater than the minimal diameter of the first section, and less than the minimal diameter of the third section. The boundaries between these sections are illustrated by dashed lines.

Another embodiment can also be explained with the help of FIG. 6. Accordingly, the inventive shock absorber comprises the sleeve, whose operative surface includes the rod-cap-adjoined region (illustrated on FIG. 1 and denoted by reference numeral 8), which region consists of three sections: —a first section, most proximate to the rod cap 5, including the narrowest minimum denoted by reference numeral 28; —a second (middle) section, including the narrowest minimum denoted by reference numeral 27; and a third section, most remote from the rod cap 5, including the narrowest minimum denoted by reference numeral 26. The minimal diameter of the second (middle) section is less than the minimal diameter of the first section, and is greater than the minimal diameter of the third section. The boundaries between these sections are illustrated by dashed lines.

In the embodiment shown on FIG. 7, the inventive shock absorber comprises the sleeve, whose operative surface includes the piston-cap-adjoined region (illustrated on FIG. 1 and denoted by reference numeral 6), which region consists of three sections: —a first section, most proximate to the piston cap 4, including the narrowest minimum denoted by reference numeral 29; —a second (middle) section, including the narrowest minimum denoted by reference numeral 30; and a third section, most remote from the piston cap 4, including the narrowest minimum denoted by reference numeral 31. The minimal diameter of the second (middle) section is less than the minimal diameter of the first section, and greater than the minimal diameter of the third section. The boundaries between these sections are illustrated by dashed lines.

Another embodiment can also be explained with the help of FIG. 7. Accordingly, the inventive shock absorber comprises the sleeve, whose operative surface includes the rod-cap-adjoined region (illustrated on FIG. 1 and denoted by reference numeral 8), which region consists of three sections: —a first section, most proximate to the rod cap 5, including the narrowest minimum denoted by reference numeral 31; —a second (middle) section, including the narrowest minimum denoted by reference numeral 30; and a third section, most remote from the rod cap 5, including the narrowest minimum denoted by reference numeral 29. The minimal diameter of the second (middle) section is greater than the minimal diameter of the first section, and is less than the minimal diameter of the third section. The boundaries between these sections are illustrated by dashed lines.

Figure 2:
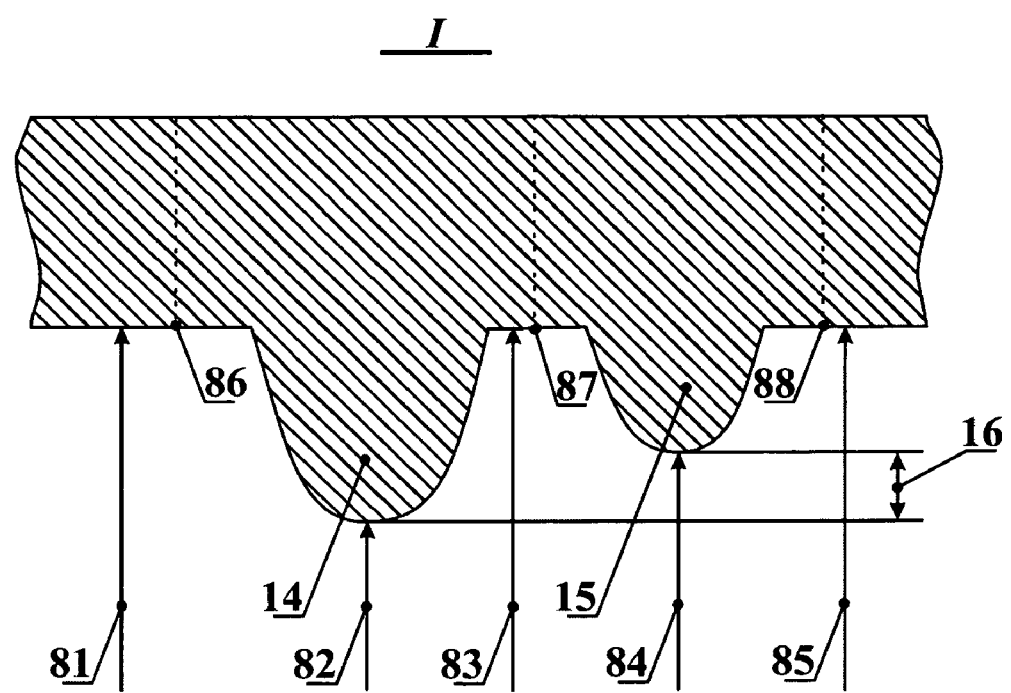
FIG. 2 shows a detail view of a region I of the inner surface of sleeve; the region I is proximate to the piston cap; three dashed lines are shown in FIG. 2, which dashed lines represent boundaries between two sleeve surface sections of the region I.

In the embodiment illustrated on FIG. 2, the inventive shock absorber comprises the sleeve having a 'piston-cap-adjacent' region that includes two sections: a first section (located between points 86 and 87) proximate to the piston cap, and a second section (located between points 87 and 88) remote from the piston cap. The first section has a first minimal diameter 82. The second section has a second minimal diameter 84. In this embodiment, the first minimal diameter 82 is less than the second minimal diameter 84. The difference between the two diameters is equal to 50 micrometers, which is a preferable value chosen from the aforementioned range from 3 to 10 micrometers.

The difference of 3–10 micrometers can be achieved by processing the sleeve with an automatic turning lathe of a class C precision. The difference of 10–50 micrometers can be achieved by processing the sleeve with an automatic turning lathe of a class B precision. The difference of 50–100 micrometers can be achieved by processing the sleeve with an automatic turning lathe of a class H precision. The precision classes are named according to the standards of Russian Federation—general precision test requirements to metal cutting machines.

Figure 3:
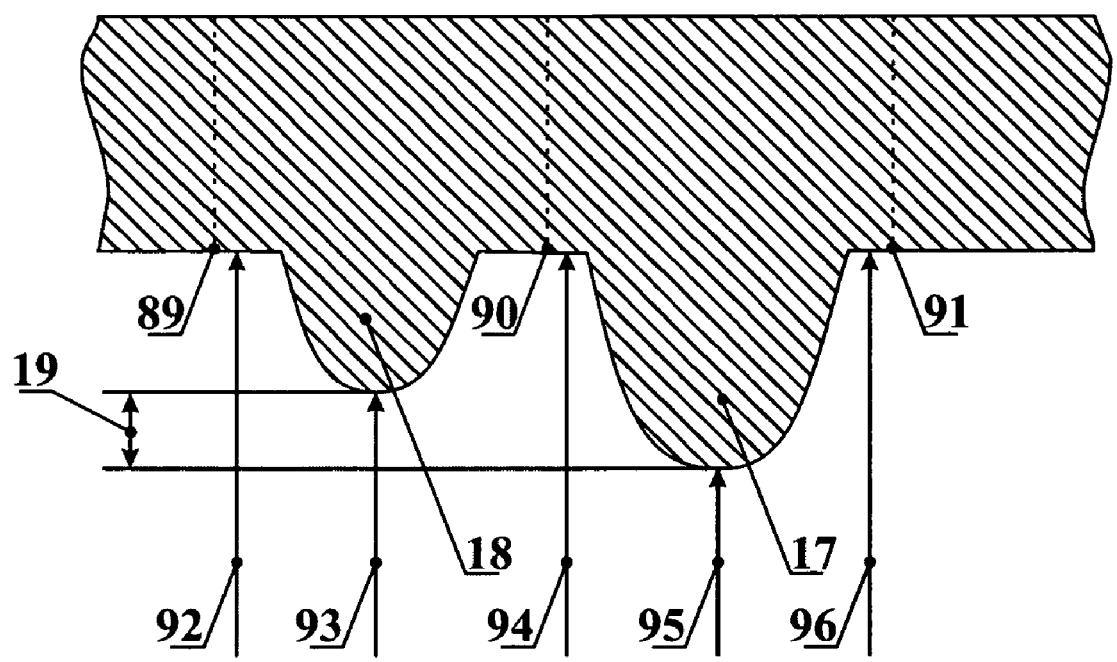
FIG. 3 shows a detail view of a region II of the inner surface of sleeve; the region II is proximate to the piston cap; three dashed lines are shown in FIG. 3, which dashed lines represent boundaries between two sleeve surface sections of the region II.

In the embodiment illustrated on FIG. 3, the inventive shock absorber comprises the sleeve having a 'rod-cap-adjacent' region that includes two sections: a first (right) section (located between points 90 and 91) proximate to the rod cap, and a second (left) section (located between points 89 and 90) remote from the rod cap. The first section has a first minimal diameter 95. The second section has a second minimal diameter 93. In this embodiment, the first minimal diameter 95 is less than the second minimal diameter 93. The difference between the two diameters is equal to 50 micrometers, which is a preferable value chosen from the aforementioned range from 3 to 10 micrometers. This difference can be achieved by processing the sleeve with the aforementioned automatic turning lathes.

In another embodiment, the inventive shock absorber comprises the sleeve having a 'piston-cap-adjoined' region that includes two sections: a first section proximate to the piston cap, and a second section remote from the piston cap. The first section has a first minimal diameter. The second section has a second minimal diameter. In this embodiment, the first minimal diameter ($D_p$) is less than the second minimal diameter. The sleeve also has a 'rod-cap-adjacent' region that includes two sections: a third section remote from the rod cap with a third minimal diameter, and a fourth section proximate to the rod cap with a fourth minimal diameter. In this embodiment, the fourth minimal diameter ($D_{ch}$) is less than the third minimal diameter.

A first example of such embodiment follows:
$D_p$=22.950 mm.
$D_{ch}$=22.900 mm.

$|D_p-D_{ch}|=|22.950-22.900|=50$ micrometers.

A second example of such embodiment follows:
$D_p$=22.700 mm.
$D_{ch}$=22.705 mm.

$|D_p-D_{ch}|=|22.700-22.705|=5$ micrometers.

The difference of 3–10 micrometers can be achieved by processing the sleeve with an automatic turning lathe of a class C precision. The difference of 10–50 micrometers can be achieved by processing the sleeve with an automatic turning lathe of a class B precision.

FIG. 8 illustrates the rod and the piston. Valves and orifices are not shown. As mentioned above, the rod operative portion 38 (shown on FIG. 8) consists of a region 32 ('piston-adjoined' region) having a length 35, a region 33 ('middle' region) having a length 36, and a region 34 ('free end connected' region, i.e. adjoined to the free and of the rod 3) having a length 37. The lengths 35, 36, and 37 are equal in this embodiment.

In the above embodiment, the inventive shock absorber may comprise: the rod with the 'piston-adjoined' region including two sections, for each section the diameter increases to a maximal diameter of corresponding section, and then decreases to a minimal diameter of corresponding section. As shown on FIG. 9, a first section proximate to the piston includes a widening 40 of its outer maximal diameter, whereas a second section remote from the piston includes a widening 39 of its outer maximal diameter.

In another embodiment shown on FIG. 10, the inventive shock absorber may comprise: the rod with the 'rod-adjoined' region including two sections, for each section the diameter increases to a maximal diameter of corresponding section, and then decreases to a minimal diameter of corresponding section. A first section proximate to the rod cap (and remote from the piston cap) includes a widening 42 of its outer maximal diameter, whereas a second section remote from the rod cap (and proximate to the piston cap) includes a widening 41 of its outer maximal diameter.

In another embodiment shown on FIG. 11, the inventive shock absorber may comprise: the rod with the 'middle' region including three sections, for each section the diameter increases to a maximal diameter of corresponding section, and then decreases to a minimal diameter of corresponding section. A first section proximate to the piston cap includes a widening 43 of an outer maximal diameter of the first section; a second middle section includes a widening 44 of an outer maximal diameter of the second section; and a third section remote from the piston cap includes a widening 45 of an outer maximal diameter of the third section. In this embodiment, the outer maximal diameter of the second section is greater than the outer maximal diameter of the first section, or the one of the second section. In this embodiment, the aforementioned sections are made adjacent.

In another embodiment, the inventive shock absorber comprises the rod having a piston-adjoined region that includes two sections: a first section, proximate to the piston, having a first maximal rod diameter; and a second section, remote from the piston, having a second maximal rod diameter. In this embodiment, the first maximal rod diameter is greater than the second maximal rod diameter. The difference of the diameters ranges from 3 to 100 micrometers.

In another embodiment, the inventive shock absorber comprises the rod having a free-end-adjoined region that includes two sections: a first section, proximate to the piston, having a first maximal rod diameter; and a second section, remote from the piston, having a second maximal rod diameter. In this embodiment, the first maximal rod diameter is less than the second maximal rod diameter. The difference of the diameters ranges from 3 to 100 micrometers.

The difference of 3–10 micrometers can be achieved by processing the rod with an automatic turning lathe of a class C precision. The difference of 10–50 micrometers can be achieved by processing the rod with an automatic turning lathe of a class B precision. The difference of 50–100 micrometers can be achieved by processing the rod with an automatic turning lathe of a class H precision. The precision classes are named according to the standards of Russian Federation—general precision test requirements to metal cutting machines.

Examples of Operation of the Invention

Below is a few examples of operation of the inventive shock absorber. It is known that a typical shock absorber is a double-action mechanism. It damps oscillations of the suspension system at the forward travel (compression stroke) and at the reverse travel of the piston 2. This damping is usually achieved due to: resistance of compressed gas; resistance experienced by the operative liquid that overflows from one chamber of the sleeve to the other; friction of the piston's seal against the operative surface of the sleeve; and friction between the rod and the sleeve's seal.

Traditional liquid dampers, widely described in the related art, envisage offering a resistance to the liquid cross-flow from one sleeve's chamber to the other, which resistance essentially prevails over friction resistance forces arising between the piston's seal and the sleeve's internal walls during movements of the piston inside the sleeve. In contrast, the proposed invention is characterized in that the friction resistance forces between the piston's seal and the sleeve's internal walls are significantly increased.

The shock absorber is mounted on a transportation means and damps oscillations, of the transportation means during its movement. Urged by external forces, the piston moves inside the sleeve, for example, within the middle region of sleeve, towards the piston cap. Also, for example, the sleeve's piston-cap-adjoined region includes at least two sections. On each section, the sleeve's inner diameter decreases along the length of respective section to a minimal inner diameter of the corresponding section forming a narrowing neck, and then increases to a maximal inner diameter of the corresponding section forming a widening neck. The narrowing and widening necks of the sleeve essentially increase the resistance forces predeterminedly impeding the piston's movements in the sleeve.

The piston 2 (shown on FIG. 1) moves from the right to the left (to the piston cap 4) in the region 6, making a forward travel (head stroke). The side surface 108 of the seal 9 interacts with the narrowing neck (annular 'small' hump) 15 (shown on FIG. 2), and then with the narrowing neck (annular 'big' hump) 14 (shown on FIG. 2). Then the piston makes a reverse travel from the left to the right (to the rod cap 5) in the region 6. The side surface 109 of the seal 9 interacts with the narrowing neck 14 and then with the narrowing neck 15 (shown on FIG. 2). Differing from the prototype device of related art, the present invention envisages the use of the two side surfaces of the seal 9 during the forward and reverse travels while the piston is positioned within the piston-cap-adjoined region 6 of sleeve.

The small hump 15 has a clearance diameter 84 shown on FIG. 2 (or 2Dmin shown on FIG. 16) and the big hump 14 has a clearance diameter 82 shown on FIG. 2 (or 1Dmin shown on FIG. 16), wherein 2Dmin is greater than 1Dmin, and thus the small hump 15 offers a lesser resistance to the movement of piston 2 than the big hump 14 does. This provides cushioning the impact and reducing the overloading during the movement of piston 2 to the piston cap 4 (FIG. 16). This leads not only to the raising of resistance force offered to the movement of piston 2, but also to a slower increase of the resistance force that improves operation of the inventive shock absorber.

Thereafter, the piston 2 moves from the left to the right (towards the rod cap 5) continuing the reverse travel, and gets into the rod-cap-adjoined region 8. The side surface 109 of the seal 9 now interacts with the narrowing neck 17 (shown on FIG. 2), and then with the narrowing neck 18 (shown on FIG. 2). As it will be demonstrated below, the sequential narrowing and widening necks (a 'big' hump 17 and a 'small' hump 18 shown on FIG. 3 and FIGS. 25-33) can essentially affect the movements of piston. Additionally differing from the prototype device of related art, the present invention envisages the use of the two side surfaces of the seal 9 during the forward and reverse travels while the piston is positioned within the rod-cap-adjoined region 8 of sleeve (the reverse travel from the left to the right within the 'rod-cap-adjacent' section of the sleeve is shown on FIGS. 25-33).

The small hump 18 has a clearance diameter 93 shown on FIG. 3 and the big hump 17 has a clearance diameter 95 shown on FIG. 3, wherein the diameter 95 is greater than the diameter 93, and thus the small hump 18 offers a lesser resistance to the movement of piston 2 than the big hump 17 does. This provides cushioning the impact and reducing the overloading during the movement of piston 2 to the rod cap 5 (FIG. 25). This leads not only to the raising of resistance force offered to the movement of piston 2, but also to a slower increase of the resistance force that improves operation of the inventive shock absorber.

FIGS. 16-33 depict eighteen sequential phases of mutual positions of the humps' side surfaces and the piston seal side surfaces demonstrating the shape deformations of piston seal side surfaces during the forward travel of the piston 2 with the seal 9 within the 'piston-cap-adjacent' section of the sleeve, shown by an arrow (towards the piston cap 4, Phases I-IX in FIGS. 16-24), and the reverse travel of the piston 2 with the seal 9 within the 'rod-cap-adjacent' section of the sleeve, shown by an arrow (towards the rod cap 5, Phases X-XVIII in FIGS. 25-33). These deformations are conditioned by the interaction of the side surfaces 110 and 111 (FIG. 17) of seal 9 with the annular humps 14, 15 or 17, 18 during the respective Phases I-VIII (FIGS. 17-24) and Phases X-XVII (FIGS. 25-32).

A preferable condition for the aforementioned interaction is the following: the small annular hump and the big annular hump have a predetermined total width TW of the first and second annular humps measured along the longitudinal axis (shown in FIG. 16); the seal 9 has a seal width SW measured along the longitudinal axis (shown in FIG. 16); wherein the seal width SW is greater than the total width TW, which allows for overlapping the TW by the SW within Phases V (FIG. 20) and XIV (FIG. 29).

Another example of operation of the inventive shock absorber follows. As shown on FIG. 4, the region 6 and region 8 include the narrowing necks. The piston 2 moves from the right to the left (to the piston cap 4) in the region 6, making a forward travel. The side surface 108 of the seal 9 interacts with the narrowing necks 22, 20, and 21 (shown on FIG. 4). Then the piston makes a reverse travel from the left to the right (to the rod cap 5) in the region 6. The side surface 109 of the seal 9 interacts with the narrowing necks 21, 20, and 22. Differing from the prototype device of related art, the present invention envisages the use of the two side surfaces of the seal 9 during the forward and reverse travels while the piston is positioned within the piston-cap-adjoined region 6 of sleeve.

Thereafter, the piston 2 moves from the left to the right (towards the rod cap 5) continuing the reverse travel, and gets into the rod-cap-adjoined region 8. The side surface 109 of the seal 9 now interacts with the narrowing necks 21, 20, and 22 (shown on FIG. 4). Further, during the forward travel, the piston 2 moves from the right to the left, in the region 8 towards the piston cap 4, wherein the side surface 108 of the seal 9 interacts with the narrowing necks 22, 20, and 21. Differing from the prototype device of related art, the present invention envisages the use of the two side surfaces of the seal 9 during the forward and reverse travels while the piston is positioned within the rod-cap-adjoined region 8 of sleeve.

Another example of operation of the inventive shock absorber follows. The region 6 and region 8 include the narrowing necks 29, 30, and 31, according to the pattern depicted on FIG. 7. The piston 2 moves from the right to the left (to the piston cap 4) in the region 6, making a forward travel. The side surface 108 of the seal 9 sequentially interacts with the narrowing necks 29, 30, and 31. Then the piston makes a reverse travel from the left to the right (to the rod cap 5) moving within the region 6. The side surface 109 of the seal 9 sequentially interacts with the narrowing necks 21, 20, and 22.

Thereafter, the piston 2 moves from the left to the right (towards the rod cap 5) continuing the reverse travel, and gets into the rod-cap-adjoined region 8. The side surface 109 of the seal 9 now interacts with the narrowing necks 29, 30, and 31 (shown on FIG. 7). Further, during the forward travel, the piston 2 moves from the right to the left, in the region 8 towards the piston cap 4, wherein the side surface 108 of the seal 9 interacts with the narrowing necks 31, 30, and 29. This embodiment introduces asymmetry relatively to the central point 113 on the longitudinal axis 112 of sleeve into design of the shock absorber that allows avoid the auto-oscillating and resonance regimes of operation during movements of the transportation means.

Another example of operation of the inventive shock absorber follows. The region 6 includes the narrowing necks 23, 24, and 25, according to the pattern depicted on FIG. 5, and the region 8 includes the narrowing necks 26, 27, and 28, according to the pattern depicted on FIG. 6. The piston 2 moves from the right to the left (to the piston cap 4) in the region 6, making a forward travel. The side surface 108 of the seal 9 sequentially interacts with the narrowing necks 25, 24, and 23. Then the piston makes a reverse travel from the left to the right (to the rod cap 5) moving within the region 6. The side surface 109 of the seal 9 sequentially interacts with the narrowing necks 23, 24, and 25.

Thereafter, the piston 2 moves from the left to the right (towards the rod cap 5) continuing the reverse travel, and gets into the rod-cap-adjoined region 8. The side surface 109 of the seal 9 now interacts with the narrowing necks 26, 27, and 28

(shown on FIG. 6). Further, during the forward travel, the piston 2 moves from the right to the left, in the region 8 towards the piston cap 4, wherein the side surface 108 of the seal 9 interacts with the narrowing necks 28, 27, and 26. This embodiment introduces asymmetry relatively to the central point 113 on the longitudinal axis 112 of sleeve into design of the shock absorber that allows avoid the auto-oscillating and resonance regimes of operation during movements of the transportation means.

In the present description, there are disclosed twenty (1i-20i) features of manufacturing the sleeve, as well as six (1j-6j) features of manufacturing the rod. Depending on operative conditions of deployment of the inventive shock absorber, there can be dozens of combinations for design of the shock absorbers, which combinations are reflected in the Tables 1, 2, and 3 following below. The plus sign (+) marks features employed in the respective embodiment of shock absorber.

TABLE 1

Particular embodiments of shock absorber with special features

| Embodiment Number | Special features (1i-9i), employed in design of shock absorber | | | | | | | | |
|---|---|---|---|---|---|---|---|---|---|
| | 1i | 2i | 3i | 4i | 5i | 6i | 7i | 8i | 9i |
| 1 | + | | | | | | | | |
| 2 | | + | | | | | | | |
| 3 | | | + | | | | | | |
| 4 | | | | + | | | | | |
| 5 | | | | | + | | | | |
| 6 | | | | | | + | | | |
| 7 | | | | | | | + | | |
| 8 | | | | | | | | + | |
| 9 | | | | | | | | | + |
| 10 | + | + | | | | | | | |
| 11 | | + | + | | | | | | |
| 12 | | | + | + | | | | | |
| 13 | | | | + | + | | | | |
| 14 | | | | | + | + | | | |
| 15 | | | | | | | + | + | |

TABLE 2

Particular embodiments of shock absorber with special features

| Embodiment Number | Special features (10i-18i), employed in design of shock absorber | | | | | | | | |
|---|---|---|---|---|---|---|---|---|---|
| | 10i | 11i | 12i | 13i | 14i | 15i | 16i | 17i | 18i |
| 16 | + | + | + | | | | | | |
| 17 | | + | + | + | | | | | |
| 18 | | | + | + | + | | | | |
| 19 | | | | + | + | + | | | |
| 20 | | | | | + | + | + | | |
| 21 | | | | | | + | + | + | |
| 22 | | | | | | | + | + | + |
| 23 | + | | | | | | | + | + |
| 24 | + | + | | | | | | | + |
| 25 | + | + | | + | + | | | | |
| 26 | | + | + | + | + | | | | |
| 27 | | | + | + | + | + | | | |
| 28 | | | | + | + | + | + | | |
| 29 | | | | | + | + | + | + | |
| 30 | | | | | | + | + | + | + |

TABLE 3

Particular embodiments of shock absorber with special features

| Embodiment Number | Special features (10i-18i), employed in design of shock absorber | | | | | | | |
|---|---|---|---|---|---|---|---|---|
| | 19i | 20i | 1j | 2j | 3j | 4j | 5j | 6j |
| 31 | + | + | + | + | + | | | |
| 32 | | + | + | + | + | + | | |
| 33 | | + | + | + | + | + | + | |
| 34 | | | + | + | + | + | + | + |
| 35 | + | | | + | + | + | + | + |
| 36 | + | + | | | + | + | + | + |
| 37 | + | + | + | | | + | + | + |
| 38 | + | + | + | + | | | | + |
| 39 | + | + | + | + | + | + | | |
| 40 | + | + | + | + | + | + | | |
| 41 | | + | + | + | + | + | + | |
| 42 | | + | + | + | + | + | + | + |
| 43 | + | | | + | + | + | + | + |
| 44 | | | | + | + | + | | |
| 45 | | | | | | + | + | + |

The more special features are utilized in the design of a particular embodiment of shock absorber, the greater the additional novel result (avoiding or substantial suppressing the auto-oscillation and resonance regimes) will be achieved. There may be situations, where various embodiments of the inventive shock absorber can be employed in design of one transportation means. For instance, embodiments No. 1, 5, 10, and 45, or embodiments No. 10, 15, 7, and 35 can be utilized for a particular automobile (car or truck). This may help suppressing the auto-oscillation and resonance regimes during the movements of the automobile even to a higher extent.

Experimental Research

During the development of the present invention, a number of experiments were conducted. In particular, four shock absorbers were manufactured for experimental purposes. These four shock absorbers are described below.

Experiment 1

The sleeve of the first shock absorber was made according to the prototype. The sleeve of the shock absorber was furnished with a narrowing neck 47, shaped as an element of a circle, which was arranged on the inner surface of a sleeve 46. A length 53 of this element was 50 micrometers, and a reduction of the sleeve's radius 54 was 50 micrometers. A compound piston seal TPS/T was utilized for the shock absorber. It's worth to note that the design of the prototype was also associated with narrowing sleeves, wherein the narrowing section had a length of several millimeters, whereas the inventive sleeves have the length of narrowing sections not exceeding 100 micrometers.

FIG. 12 shows a sleeve 46, and a portion of the piston with a seal 48. The piston moves towards the direction indicated by a pointing arrow 49, wherein a side surface 111 of the seal 48 faces forward. FIG. 12 also shows a graph located under the picture, which graph illustrates a dependency of a force 'P', counteracting the movement of the piston in the sleeve, upon a coordinate 'l' of the right side surface 111 of the seal 48.

During the movement along the section with the greater diameter, force P had a value of 5 Newton (see position 50 on FIG. 12). During the overcoming of resistance of the seal 48, at the narrowing neck 54, there was a surge 51 of force P in the amount of 345 Newton. The mechanical work of the piston for overcoming the resistance of force P on the distance 53 of 50 micrometers was 8500 Newton*micrometer. After the side surface 111 passed the narrowing neck, force P became 20 Newton (see position 52 on FIG. 12).

In this experiment, the measurements of inner boundaries of cross-sections of the sleeve were carried out with a coordinate-measuring machine UPMC—850 No. 85164. The measurements were conducted in such a way that the nearest cross-sections were situated at a distance of 1 mm from each other. For each section, an amount of the corresponding inner diameter (i.e. the diameter of inner boundary of a cross-section of the sleeve) was determined.

Experiment 2

The second experiment is illustrated on FIG. 13. The inner surface of a sleeve 57 had two narrowing necks shaped as semi-circles with a width 55 of 100 micrometers equal for both the necks. The distance 56 between the necks 55 was chosen of 50 micrometers. The difference 58 between the radiuses of the necks amounted to 50 micrometers.

A sleeve 57 is depicted on FIG. 13. The piston 46 having the seal 48 with the side surface 111 are shown on FIG. 12. The piston moves forward, overcoming the resistance of the narrowing necks. FIG. 13 contains a graph located below the picture. The graph illustrates a dependency of a force 'P', counteracting the movement of the piston in the sleeve, upon a coordinate '1' of the right side surface 111 of the seal.

During the movement of piston along the section with the greater diameter, force P had a value of 5 Newton (that corresponds to a level 59 on the graph). During the overcoming the narrowing necks, there were two surges of force P (with respective levels 60 and 62). Each such surge was essentially equal to 345 Newton. The mechanical work for overcoming the force P on each surge, carried out by the piston, is equal: (345 N−5 N)*50 micrometers/2=8500 Newton*micrometer.

After the moment when the side surface 111 of seal 48 passed the first narrowing neck, the resistance force P becomes 5 Newton reflected by a level 61 on FIG. 13. Likewise, after the moment when the side surface 111 of seal 48 passed the second narrowing neck, the resistance force P becomes 5 Newton reflected by the level 61. After each surge, force P was 5 Newton, whereas for the prototype, force P was 20 Newton (level 52 on FIG. 12).

The mechanical work of the prototype's piston for overcoming the force P on the length of 200 micrometers is equal: (20N−5N)*200 micrometer=3000 Newton*micrometers. The mechanical work of the inventive piston for overcoming the force P at the two narrowing necks on the length of 200 micrometers is equal: 2×8500 Newton*micrometers=1700 Newton*micrometers, that is the work for overcoming resistance of the narrowing necks for the forward travel is about 5.5 times greater for the inventive shock absorber than for the prototype shock absorber. The same work will be completed by the piston on its way back (reverse travel) where the side surface 110 will face the direction of movement, i.e. the total increase of the work for overcoming the resistance (that affects the damping capacity of the shock absorber) will be at least 10 times.

Experiment 3

The third experiment is illustrated on FIG. 14. The shock absorber comprises a sleeve 63 and a piston (not shown) with a seal 48 having two seal surfaces 110 and 111 (shown on FIG. 12). The sleeve 63 has two narrowing necks, formed by elements outstanding from the sleeve's walls and having a trapezium-like shape (as shown on FIG. 14). The length of each such narrowing neck (summarizing sections 64, 65, and 66) constitutes 150 micrometers. The distance 67 between the two necks is 50 micrometers. As in the previous experiment, the radius difference is 50 micrometers.

FIG. 14 reflects the movement of piston from the left to the right, i.e. the side surface 111 faces the direction of movement, overcoming the narrowing necks. A graph located under the picture on FIG. 14 shows a dependency of force 'P', counteracting the movement of the piston, upon coordinate '1' of the surface 111.

During the movement of the piston in the piston's section with a greater diameter, force P had a value of 5 Newton (see the level 68 on FIG. 14). At the time of overcoming each narrowing neck, a surge of force P was observed (levels 69 and 71 on FIG. 14). Each such surge was 515 Newton. The mechanical work completed by the piston for overcoming force P on each surge was 12750 Newton*micrometers: (515N−5N)*50 micrometers/2=12750 Newton*micrometers.

After the moment when the side surface 111 of seal 48 passed the first narrowing neck, the resistance force P becomes 5 Newton reflected by a level 70 on FIG. 14. Likewise, after the moment when the side surface 111 of seal 48 passed the second narrowing neck, the resistance force P becomes 5 Newton reflected by the level 62 on FIG. 14. After each surge, force P was 5 Newton, whereas force P on a distance equal to the length 54 was 30 Newton for a one-direction narrowing (like in the prototype).

The mechanical work of the prototype's piston for overcoming the force P on the length of 200 micrometers is equal: (30N−5N)*200 micrometer=5000 Newton*micrometers. The mechanical work of the inventive piston for overcoming the force P at the two narrowing necks on the length of 200 micrometers is equal: 2×12750 Newton*micrometers=25500 Newton*micrometers, that is the work for overcoming resistance of the narrowing necks for the forward travel is about 5.5 times greater for the inventive shock absorber than for the prototype shock absorber. The same work will be completed by the piston on its way back (reverse travel) where the side surface 110 will face the direction of movement, i.e. the total increase of the work for overcoming the resistance (that affects the damping capacity of the shock absorber) will be at least 10 times.

Experiment 4

The fourth experiment is illustrated on FIG. 15. The shock absorber comprises a sleeve 73 and a piston (not shown) with a seal 48 having two seal surfaces 110 and 111 (shown on FIG. 12). The sleeve 73 has a narrowing neck, formed by an element outstanding from the sleeve's walls and having a trapezoid-like shape (as shown on FIG. 15). The length 74 of the narrowing neck constitutes 50 micrometers. As in the previous experiment, the radius difference is 50 micrometers.

FIG. 15 reflects the movement of piston from the left to the right, i.e. the side surface 111 faces the direction of movement, overcoming the narrowing necks. A graph located under the picture on FIG. 15 shows a dependency of force 'P', counteracting the movement of the piston, upon coordinate '1' of the surface 111.

During the movement of the piston in the piston's section with a greater diameter, force P had a value of 5 Newton (see the level 75 on FIG. 15). At the time of overcoming the narrowing neck, a surge of force P was observed (level 76 on FIG. 15). The surge was 1555 Newton. The mechanical work completed by the piston for overcoming force P on the surge was 38750 Newton*micrometers. After the side surface 111 passed the narrowing neck, force P became 5 Newton (level 77 on FIG. 15).

The experiments confirmed a high efficiency of the claimed shock absorber. The full mechanical work of force P depends on: the number of narrowing and widening necks overcome by the piston's seal, the amount of narrowing (it's recommended that the narrowing not exceed 100 micrometers); on the shape of narrowing. The tougher the narrowing neck is, the greater the force surge will be achieved, i.e. the shock absorber will operate more efficiently.

It is extremely important that the narrowing and widening necks be arranged in areas adjoined to the sleeve's caps. This allows effectively decelerating the piston in these regions of the sleeve, and preventing excessive impact loads in the shock absorber.

This disclosure thusly confirms the significant increase of force counteracting the movement of the piston in the sleeve in the regions adjoined to the sleeve's caps.

The inventive design of shock absorbers provides employing two side surfaces of the piston's seal during the forward and reverse travels where the piston passes the sleeve's regions adjoined to the sleeve's caps: the piston cap and the rod cap.

We claim:

1. A shock absorber for a transportation means comprising: a sleeve having a longitudinal axis, said sleeve defining a sleeve interior surface; a piston defining a lateral surface extending along the longitudinal axis, said lateral surface of the piston is coupled with a seal; said piston operatively accomplishes reciprocal movements consisting of forward and reverse travels within said sleeve; a rod having a first end rigidly coupled with the piston and a second end extending beyond said sleeve; a piston cap enclosing said sleeve from the piston's side; a rod cap enclosing said sleeve from the rod's side; wherein:
    said sleeve is configured according to one of the following options:
        a) inside an area of said sleeve adjoined to said piston cap, said interior space of the sleeve along the sleeve includes at least two sections; on each said section the sleeve's inner diameter, being measured along a direction from said piston cap to said rod cap, decreases to a value of minimum inner diameter of said sleeve on the corresponding said section, and then increases to a value of maximum inner diameter of said sleeve on the corresponding said section; or
        b) inside an area of said sleeve adjoined to said rod cap, said interior space of the sleeve along the sleeve includes at least two sections; on each said section the sleeve's inner diameter being measured along a direction from said piston cap to said rod cap, decreases to a value of minimum inner diameter of said sleeve on the corresponding said section, and then increases to a value of maximum inner diameter of said sleeve on the corresponding said section; or
        c) inside said area adjoined to said piston cap, said interior space of the sleeve along the sleeve includes at least two sections; on each said section the sleeve's inner diameter, being measured along a direction from said piston cap to said rod cap, decreases to a value of minimum inner diameter of said sleeve on the corresponding said section, and then increases to a value of maximum inner diameter of said sleeve on the corresponding said section; and
            inside said area adjoined to said rod cap, said interior space of the sleeve along the sleeve includes at least two sections; on each said section the sleeve's inner diameter being measured along a direction from said piston cap to said rod cap, decreases to a value of minimum inner diameter of said sleeve on the corresponding said section, and then increases to a value of maximum inner diameter of said sleeve on the corresponding said section;
wherein the decrease of said inner diameter to a value of minimum inner diameter of said sleeve on the corresponding said section and the increase of said inner diameter to a value of maximum inner diameter of said sleeve on the corresponding said section are formed as annular humps; and wherein said seal has an annular shape defining two side surfaces extending transversely to the longitudinal axis of said sleeve, said two side surfaces interact with said annular humps during the forward and reverse travels, such that the interaction causes deformations of said seal thereby operatively cushioning impacts and reducing overloads of the shock absorber.

2. The shock absorber according to claim 1, wherein
    said rod cap further comprises an orifice situated substantially in the center of said rod cap and a sleeve seal mounted in said orifice;
    said rod is capable of slidely and sealingly moving through said sleeve seal;
    said rod has a longitudinal axis;
    said rod further comprises a piston-adjoined region predeterminedly proximate to said piston, said piston-adjoined region includes two rod sections in the form of annular humps.

3. The shock absorber according to claim 2, wherein
    said two annular humps are represented by:
        a first annular hump proximate to said piston and having a first maximal diameter, and
        a second annular hump remote from said piston and having a second maximal diameter;
    wherein
    said first maximal diameter is greater than said second maximal diameter.

4. The shock absorber according to claim 3, wherein the difference between said first maximal diameter and said second maximal diameter ranges from 3 to 10 micrometers.

5. The shock absorber according to claim 1, wherein
    said rod cap further comprises an orifice situated substantially in the center of said rod cap and a sleeve seal mounted in said orifice;
    said rod is capable of slidely and sealingly moving through said sleeve seal;
    said rod has a longitudinal axis;
    said rod further comprises a free end maximally remote from said piston and a free-end region predeterminedly proximate to said free end, said free-end region includes two rod sections in the form of annular humps.

6. The shock absorber according to claim 5, wherein
    said two rod sections are represented by:
        a first annular hump remote from said free end and having a first maximal diameter, and
        a second annular hump proximate to said free end and having a second maximal diameter;
    wherein
    said first maximal diameter is greater than said second maximal diameter.

7. The shock absorber according to claim 6, wherein the difference between said first maximal diameter and said second maximal diameter ranges from 3 to 10 micrometers.

8. The shock absorber according to claim 1, wherein
    inside the area of said sleeve adjoined to said piston cap, said at least two sections are represented by a first annular hump being proximate to said piston cap and having a first minimal diameter, and a second annular hump being remote from said piston cap and having a second minimal diameter;
    wherein said first annular hump and said second annular hump have a predetermined total width of the first and second annular humps, measured along the longitudinal axis; said seal has a seal width, measured along the longitudinal axis; wherein said seal width is greater than said total width;

and wherein said first minimal diameter is less than said second minimal diameter.

9. The shock absorber according to claim 8, wherein the difference between said first maximal diameter and said second maximal diameter ranges from 3 to 10 micrometers.

10. The shock absorber according to claim 1, wherein inside the area of said sleeve adjoined to said rod cap, said at least two sections are represented by a first annular hump being most proximate to said rod cap and having a first minimal diameter, and a second annular hump being most remote from said rod cap and having a second minimal diameter;

wherein said first annular hump and said second annular hump have a predetermined total width of the first and second annular humps, measured along the longitudinal axis; said seal has a seal width, measured along the longitudinal axis; wherein said seal width is greater than said total width;

and wherein said first minimal diameter is less than said second minimal diameter.

11. The shock absorber according to claim 10, wherein the difference between said first maximal diameter and said second maximal diameter ranges from 3 to 10 micrometers.

12. The shock absorber according to claim 1, wherein said annular humps have one of the following cross-sectional shapes: a semicircle, or at least a portion of a trapezium, or at least a portion of a rectangle, or an area limited by a parabola.

\* \* \* \* \*